(12) United States Patent
Nishio et al.

(10) Patent No.: US 7,196,853 B2
(45) Date of Patent: Mar. 27, 2007

(54) ZOOM LENS SYSTEM AND IMAGE PICKUP APPARATUS HAVING THE SAME

(75) Inventors: Akihiro Nishio, Yokohama (JP); Makoto Fujimoto, Katsushika-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 11/198,487

(22) Filed: Aug. 4, 2005

(65) Prior Publication Data
US 2006/0056057 A1    Mar. 16, 2006

(30) Foreign Application Priority Data
Aug. 19, 2004    (JP) ............... 2004-240085

(51) Int. Cl.
*G02B 15/14*    (2006.01)
(52) U.S. Cl. .................................... 359/690
(58) Field of Classification Search ........ 359/676–692, 359/554–557
See application file for complete search history.

(56) References Cited

U.S. PATENT DOCUMENTS 5,654,826 A * 8/1997 Suzuki ................. 359/557
6,025,962 A   2/2000 Suzuki
6,046,852 A   4/2000 Konno
6,266,189 B1  7/2001 Konno
2005/0275949 A1* 12/2005 Fujimoto et al. ........... 359/685

FOREIGN PATENT DOCUMENTS

| JP | 9-230236 A | 9/1997 |
|---|---|---|
| JP | 9-230237 A | 9/1997 |
| JP | 10-90601 A | 4/1998 |
| JP | 10-232420 A | 9/1998 |

* cited by examiner

*Primary Examiner*—Ricky Mack
*Assistant Examiner*—M. Hasan
(74) *Attorney, Agent, or Firm*—Canon USA, Inc. Intellectual Property Division

(57) ABSTRACT

An exemplary embodiment is directed to a zoom lens system configured to impart an appropriate refractive power to an image stabilizing lens unit. The zoom lens system can include: a first lens unit; a second lens unit; and a rear lens group. The plurality of lens units constituting the rear lens group can contain a lens component, where the lens component can include: a front lens sub-component; and a rear lens sub-component. Moreover, in at least one further exemplary embodiment at least a part of the front lens sub-component or the rear lens sub-component can be moved.

18 Claims, 33 Drawing Sheets

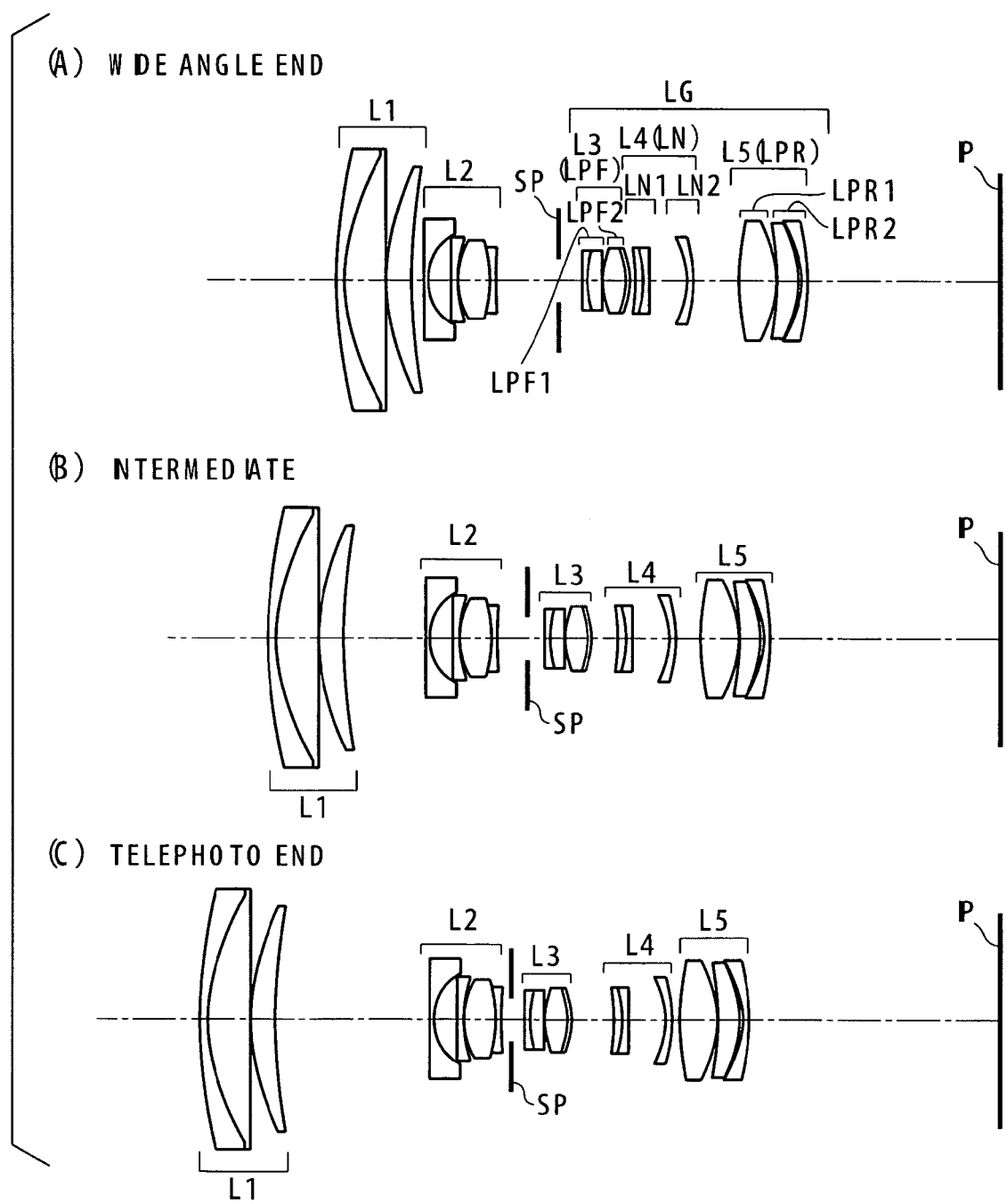

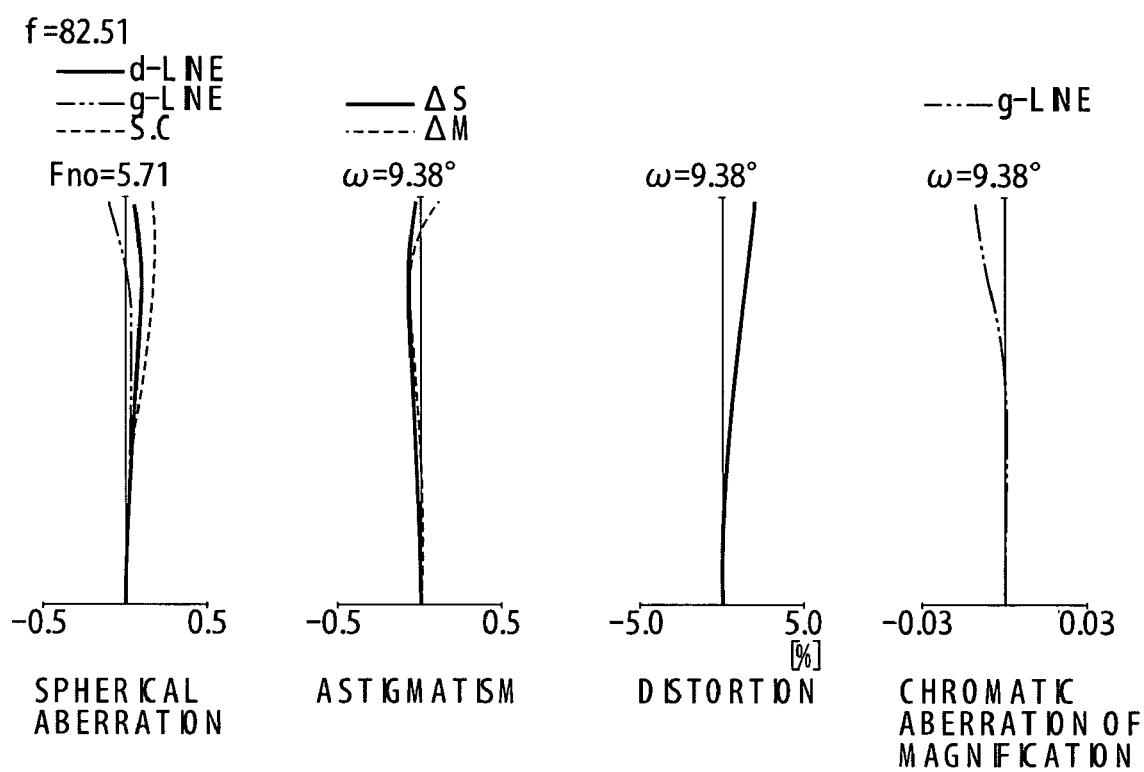

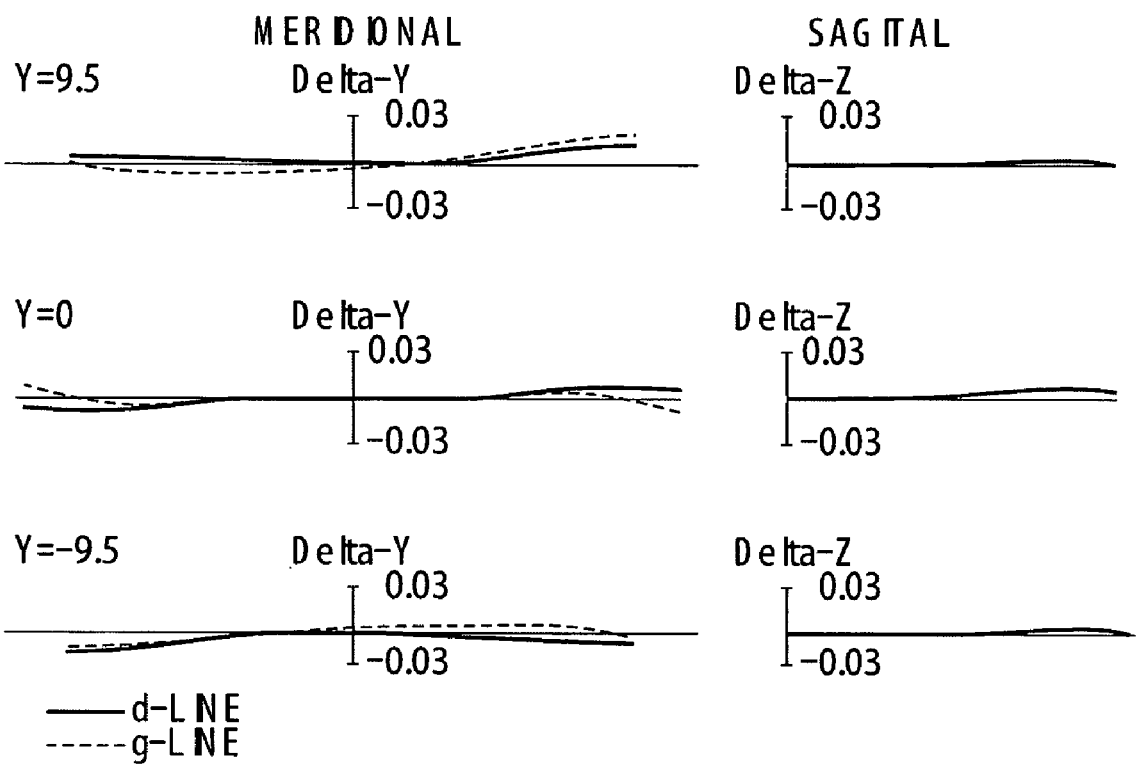

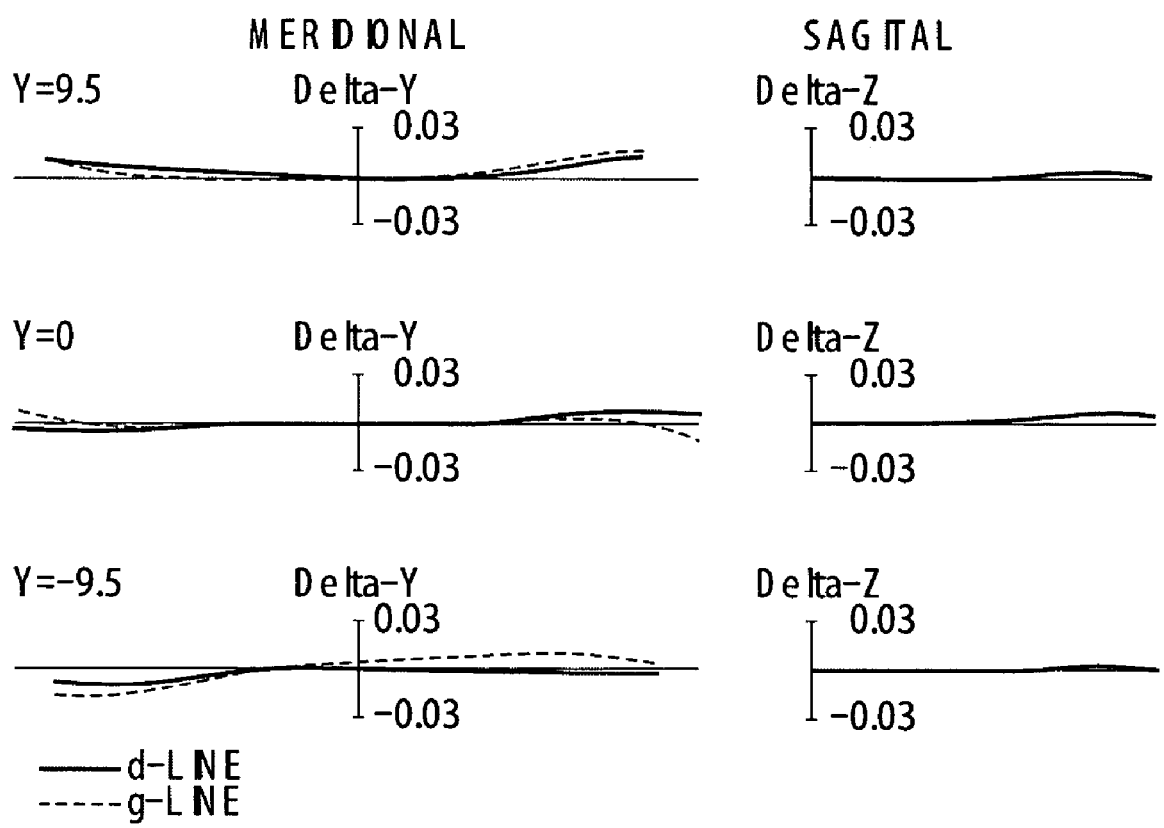

FIG. 5
(A) WIDE ANGLE END
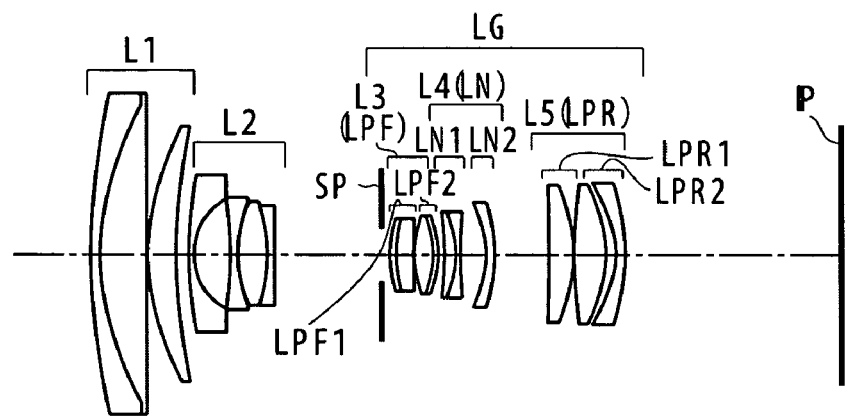
(B) INTERMEDIATE
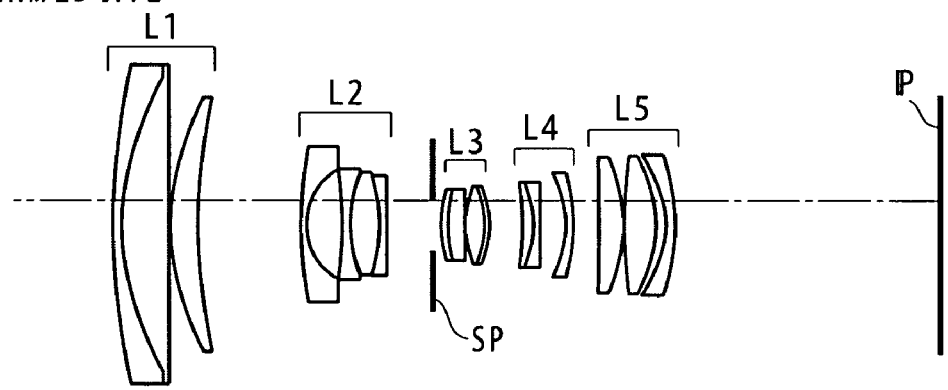
(C) TELEPHOTO END
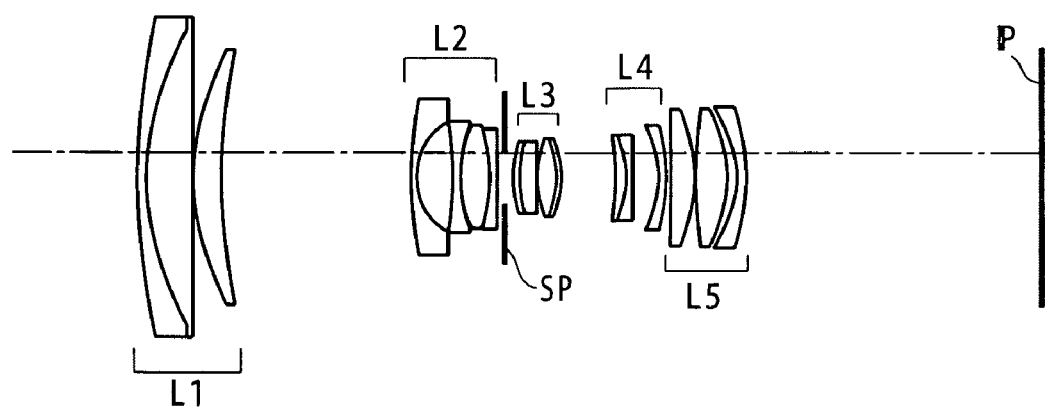

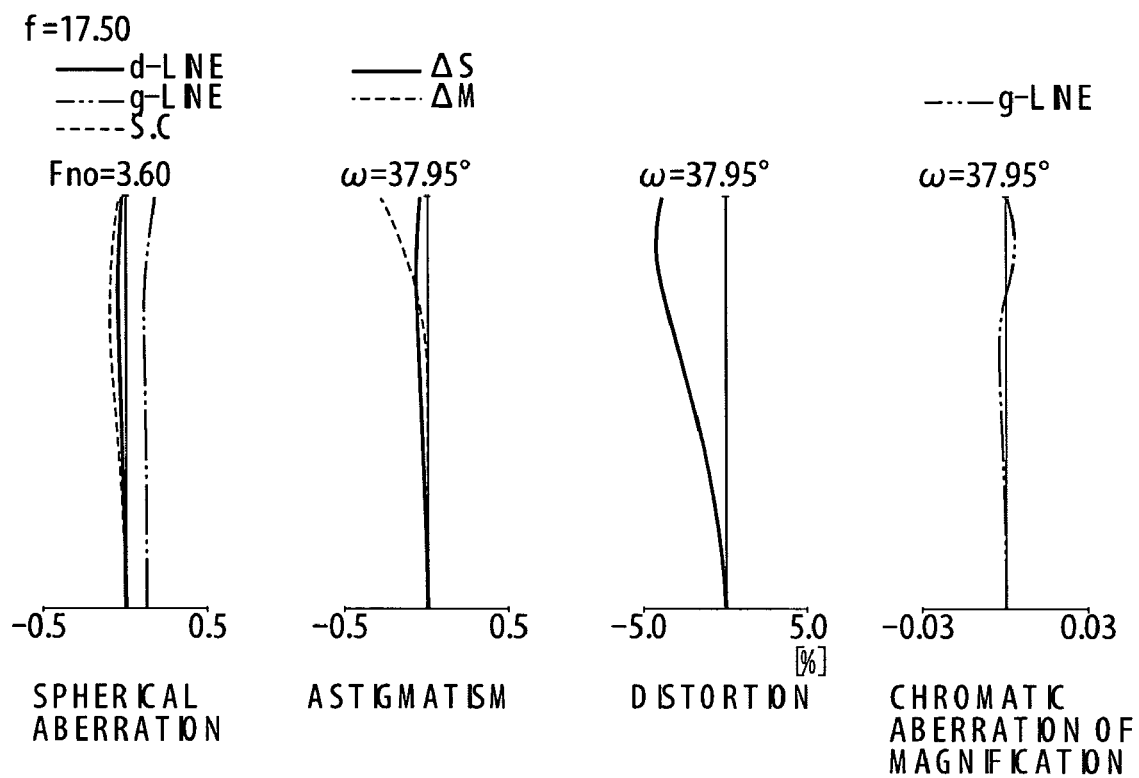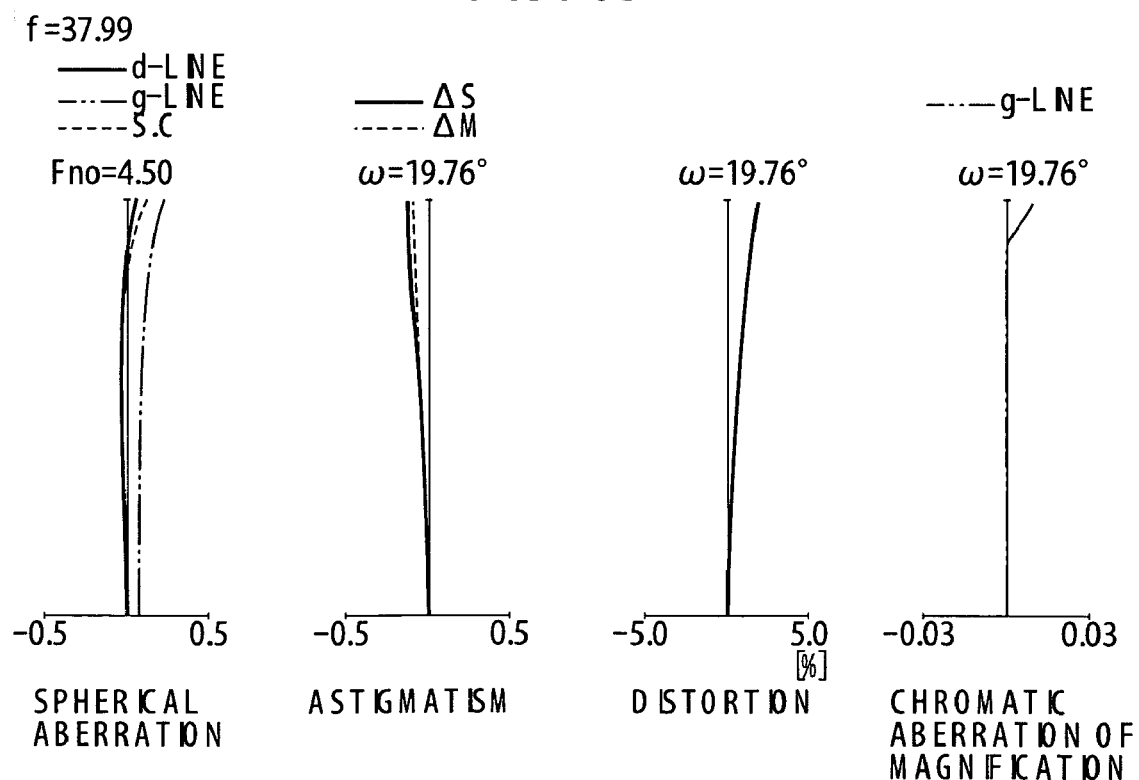

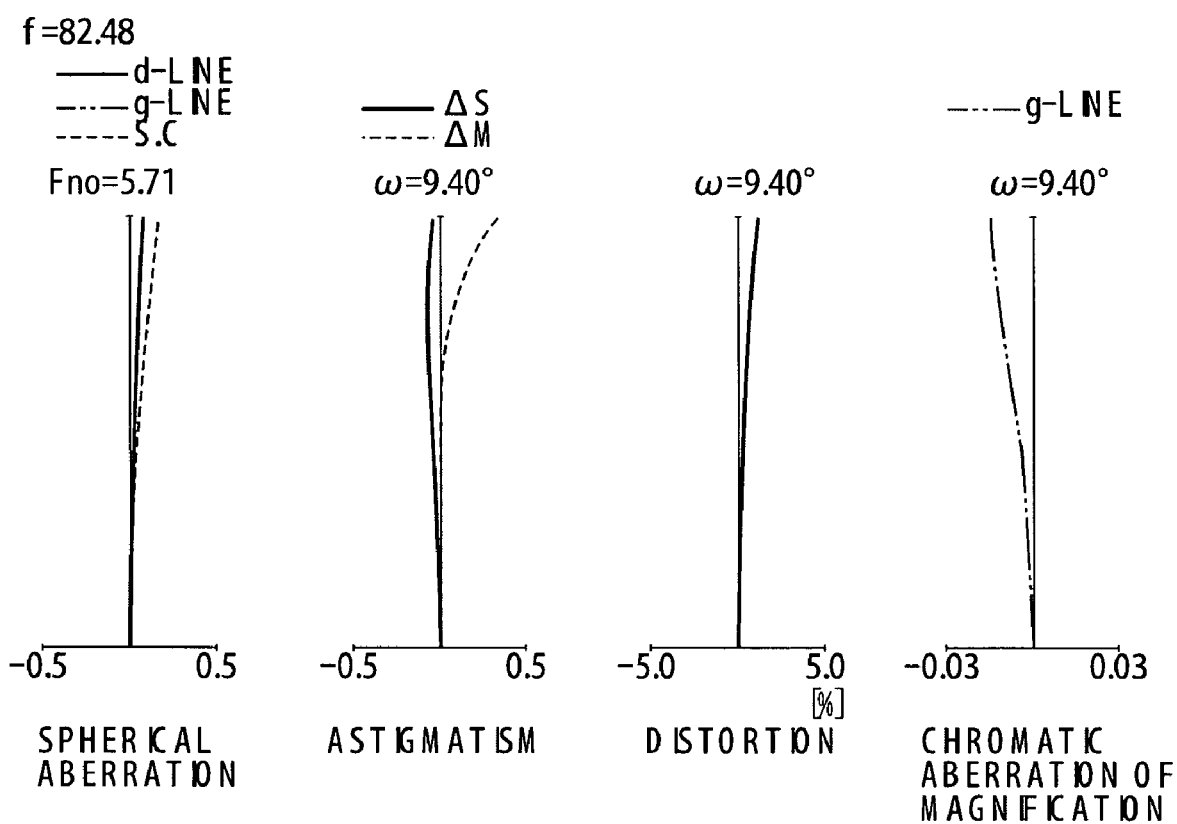

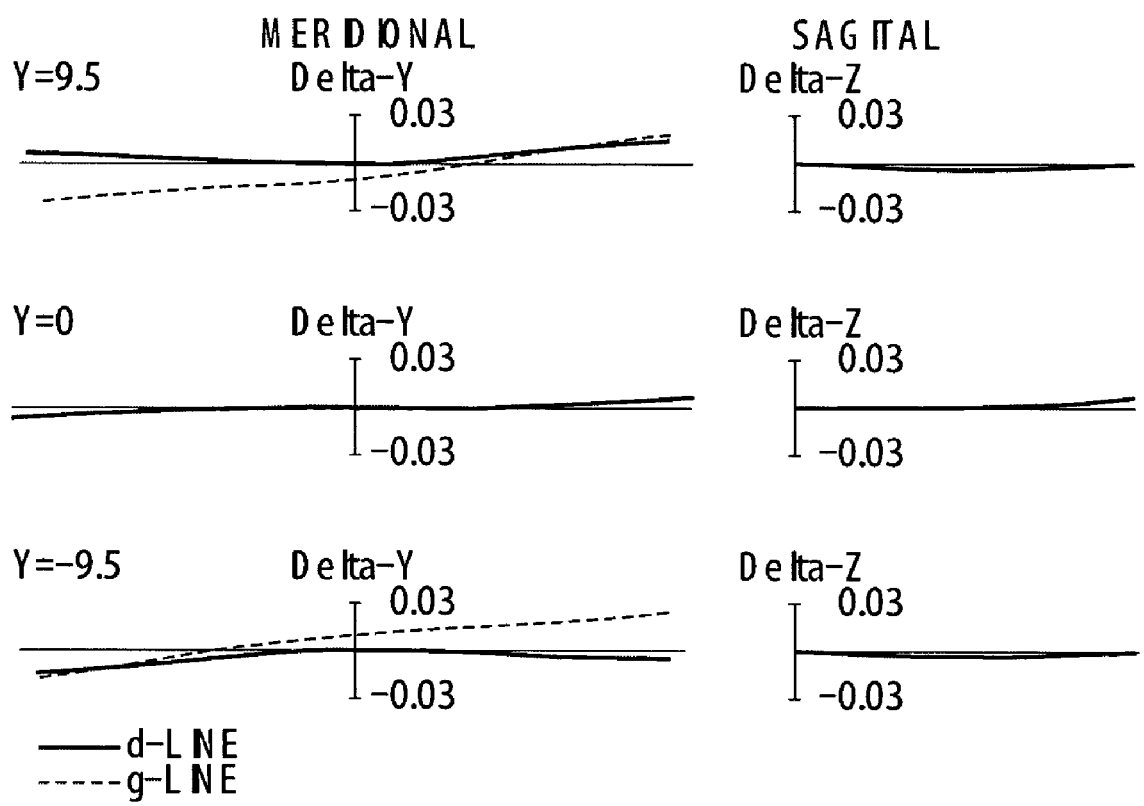

FIG. 9
(A) WIDE ANGLE END
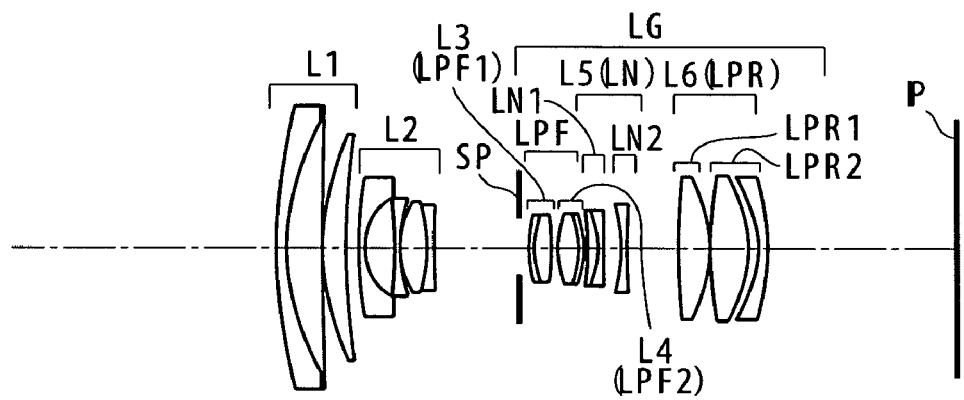
(B) INTERMEDIATE
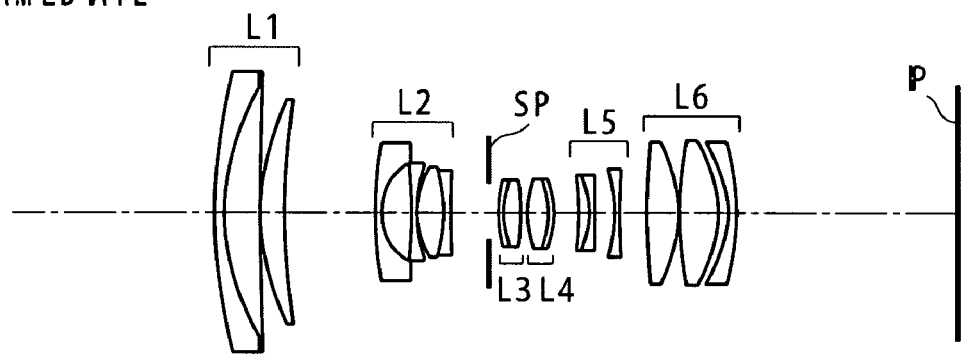
(C) TELEPHOTO END
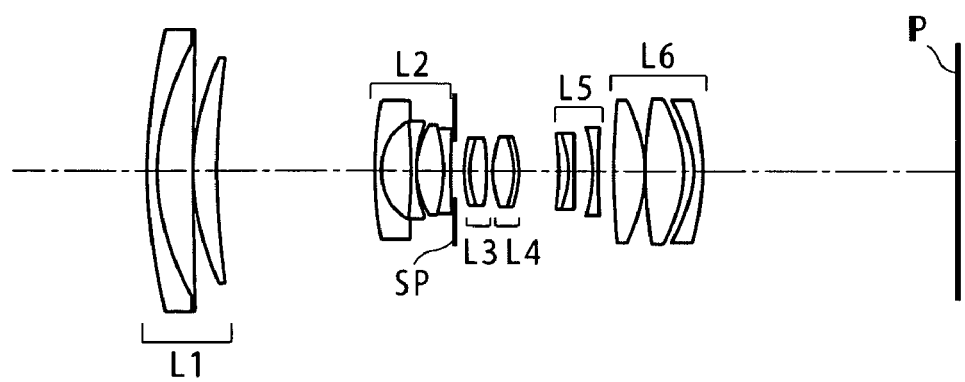

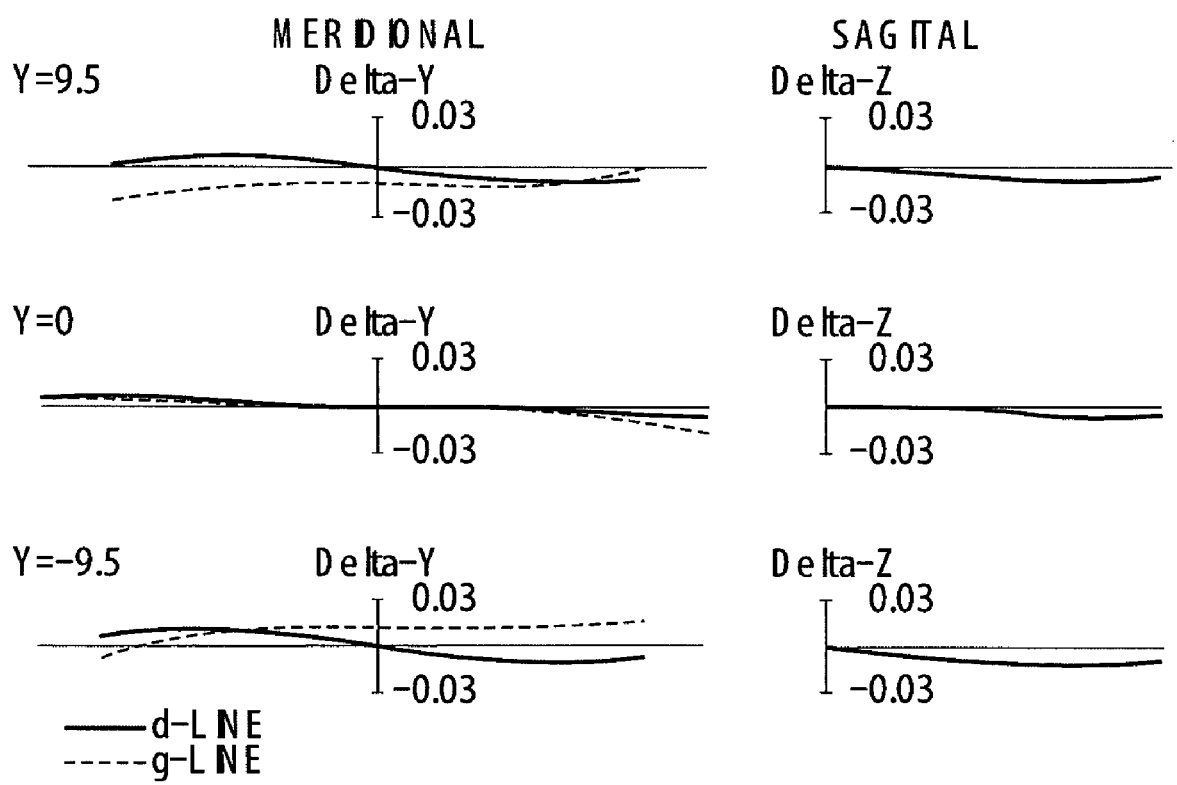

ZOOM LENS SYSTEM AND IMAGE PICKUP APPARATUS HAVING THE SAME

BACKGROUND OF THE INVENTION

1. Field of the Invention

The present invention relates to a zoom lens system.

2. Description of the Related Art

When an accidental shake (e.g., hand movement) is transferred to a photographic optical system, a vibration can be generated in a photographed image. There has heretofore been proposed a certain zoom lens provided with a mechanism (image stabilizing function) for compensating for the vibration of the image caused by this accidental shake in order to achieve an increased image quality over a non compensated system.

For example, an optical system (zoom lens) has been known in which a part of a lens unit constituting the optical system is moved substantially vertically to an optical axis (arranged in the horizontal direction) to compensate for the image vibration by the shake (see, Japanese Patent Application Laid-Open No. 9-230236, Japanese Patent Application Laid-Open No. 9-230237, Japanese Patent Application Laid-Open No. 10-232420 and Japanese Patent Application Laid-Open No. 10-90601).

In Japanese Patent Application Laid-Open No. 9-230236 (corresponding to U.S. Pat. No. 6,046,852), there is discussed a four-unit zoom lens comprising lens units having positive, negative, positive, and positive refractive powers in order from an object side to an image side. It is proposed in this zoom lens that the third lens unit be separated into a front lens subunit having positive refractive power and a rear lens subunit having positive refractive power, respectively. When the rear lens subunit is moved vertical to the optical axis, the image vibration is reduced (image stabilizing).

In Japanese Patent Application Laid-Open No. 9-230237 (corresponding to U.S. Pat. No. 6,266,189), there is discussed a four-unit zoom lens comprising lens units having positive, negative, positive, and positive refractive powers or a five-unit zoom lens comprising lens units having positive, negative, positive, positive, negative refractive powers, the units being arranged in order from the object side to the image side. In either of these zoom lenses, the second lens unit is separated into front and rear lens subunits, and either of the lens units is moved vertical to the optical axis to reduce the image vibration.

Moreover, in Japanese Patent Application Laid-Open No. 10-232420, there is discussed a four-unit zoom lens comprising lens units having positive, negative, positive, and positive refractive powers, which are arranged in order from the object side to the image side. In this zoom lens, during zooming, the first and third lens units are fixed, the third lens unit is separated into a lens subunit having positive refractive power and a lens subunit having negative refractive power, and either of the lens units can be moved vertical to the optical axis to reduce the image vibration.

In Japanese Patent Application Laid-Open No. 10-90601 (corresponding to U.S. Pat. No. 6,025,962), there is discussed a five-unit zoom lens comprising lens units having positive, negative, positive, negative, and positive refractive powers in order from the object side to the image side. There is described a constitution of the zoom lens in which the fourth lens unit, having a negative refractive power, is moved substantially vertical to the optical axis to compensate for the vibration of the image.

In general, in an optical system, a part of the lens units of a photographic optical system is used as image stabilizing lens unit, and the unit are disposed eccentrically in parallel in a vertical direction with respect to the optical axis to reduce the effect of image vibration.

However, an actuator can be used for moving the image stabilizing lens unit, and the generated eccentricity aberration can increase during an image stabilizing function.

For example, the image stabilizing lens unit, configured to reduce the image vibration, can have many constituting lenses, and thus the unit can have a large weight, and can have a large torque while performing electric driving. Unless the refractive power of the image stabilizing lens unit for reducing the image vibration is appropriately set, movement of the image stabilizing lens unit increases in order to obtain effects of reducing a certain amount of image vibration, and the whole optical system is enlarged.

Moreover, when the image stabilizing lens unit decenters the image, optical performances can be deteriorated in the case in which the image stabilizing lens unit is provided with a magnification varying function during the zooming, and in which a large refractive power is applied to the image stabilizing lens unit in order to raise an efficiency of the magnification varying function.

When a large refractive power is applied to the image stabilizing lens unit, there can also be a problem that eccentricity for obtaining a certain amount of reducing effects becomes excessively small, and it is difficult to drive/control the movement electrically or mechanically.

SUMMARY OF THE INVENTION

At least one exemaplry embodiment is directed to an optical arrangement of the image stabilizing lens units that reduces deterioration of optical performances when reducing the effects of image vibration.

An exempalry embodiment is directed to a zoom lens system configured to impart an appropriate refractive power to an image stabilizing lens unit.

At least one exemplary embodiment is directed to a zoom lens system including, in order from an object side to an image side: a first lens unit having a positive optical power; a second lens unit having a negative optical power; and a rear lens group having a positive optical power as a whole in an entire zoom range. The rear lens group can have a plurality of lens units which can move during zooming. The plurality of lens units can contain a lens component, which can have a negative optical power, whose interval from the lens unit disposed adjacent to the component changes during the zooming. The lens component can include: a front lens sub-component with negative optical power; and a rear lens sub-component with negative optical power. Moreover, when at least one of a part of the front lens sub-component and the rear lens sub-component is moved in such a manner as to have a component in a vertical direction with respect to an optical axis in the horizontal direction, an image formed by the zoom lens system is displaced.

Further features of the present invention will become apparent from the following description of exemplary embodiments (with reference to the attached drawings).

BRIEF DESCRIPTION OF THE DRAWINGS

FIG. 1 illustrates lens sectional views of a zoom lens according to exemplary embodiment 1;

FIG. 5 illustrates lens sectional views of the zoom lens according to exemplary embodiment 2;

FIG. 6 illustrates diagrams of the lateral aberrations of the zoom lens according to exemplary embodiment 2;

FIG. 9 illustrates lens sectional views of the zoom lens according to exemplary embodiment 3;

DESCRIPTION OF THE EMBODIMENTS

Figure 2A:
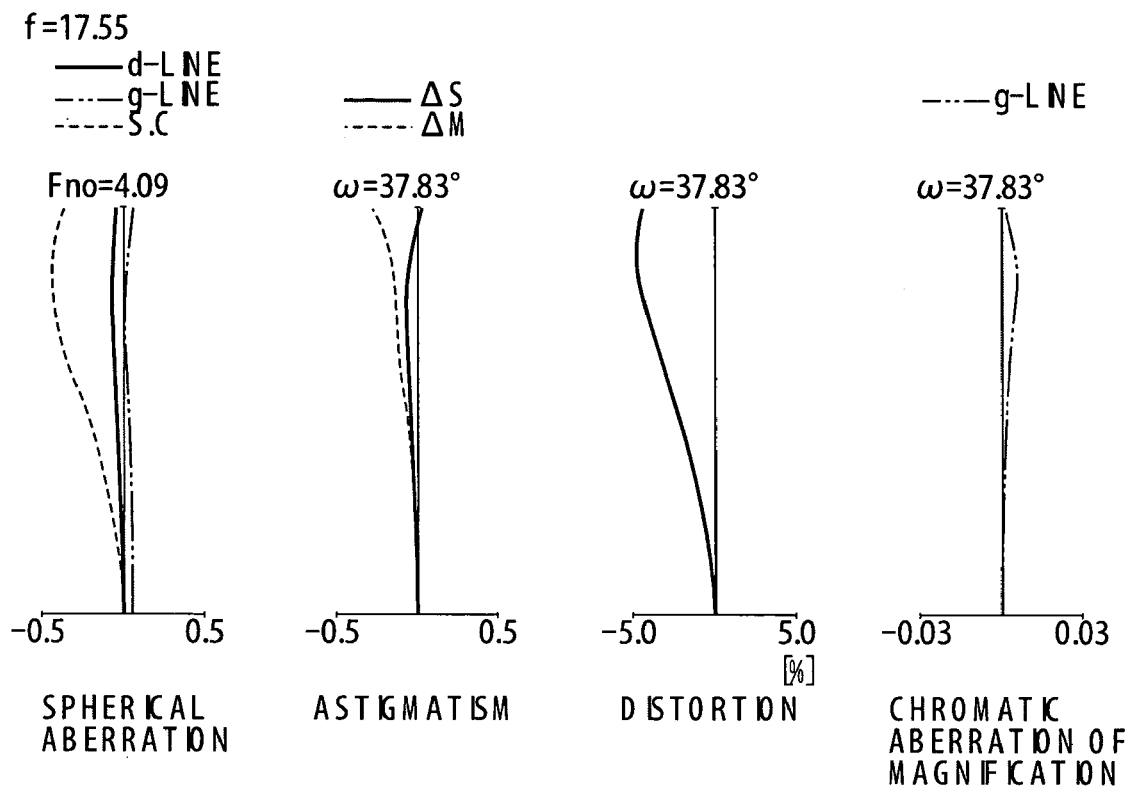
FIG. 2 illustrates diagrams of lateral aberrations of the zoom lens according to exemplary embodiment 1.

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes). Additionally exemplary embodiments are not limited to visual optical photographic systems, for example the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed for following figures.

Exemplary embodiments of a zoom lens system and an image pickup apparatus having the system will be described hereinafter.

FIGS. 1A, 1B, 1C illustrate lens sectional views in a wide angle end (short focal length end), an intermediate zoom position, and a telephoto end (long focal length end) of a zoom lens according to exemplary embodiment 1.

Figure 2B:
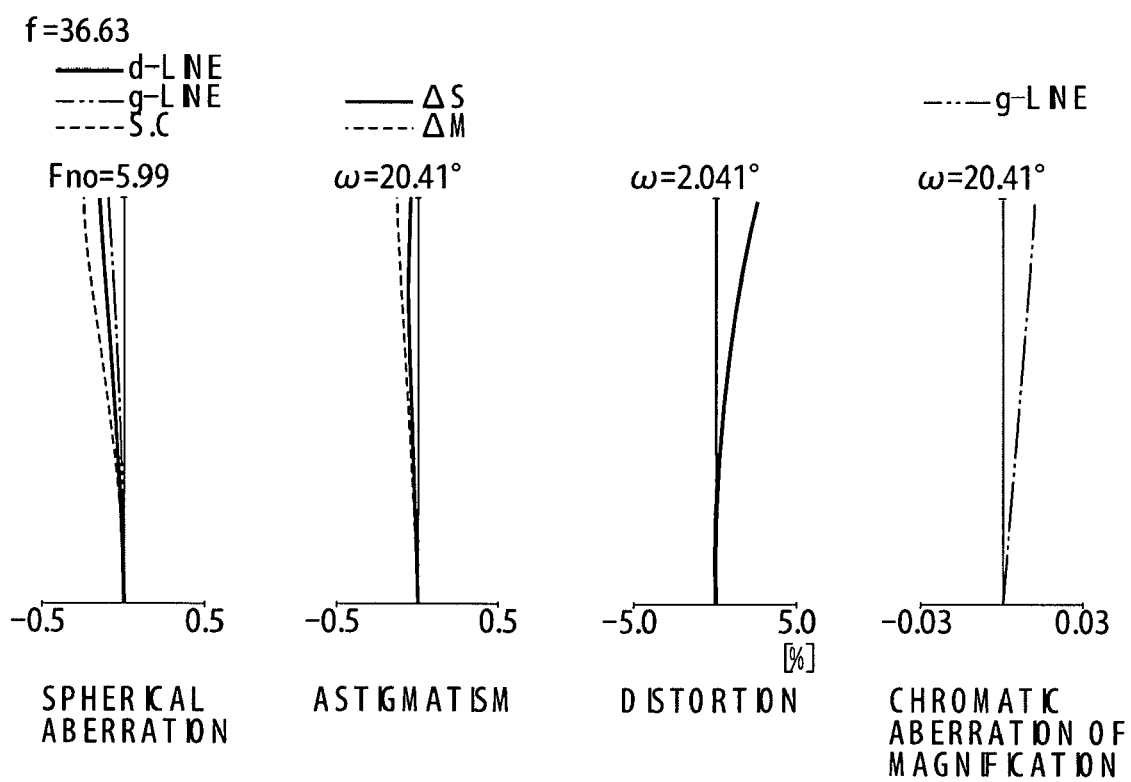

FIGS. 2A, 2B, 2C illustrate diagrams of lateral aberrations in the wide angle end, the intermediate zoom position, and the telephoto end of the zoom lens respectively, according to exemplary embodiment 1.

Figure 3A:
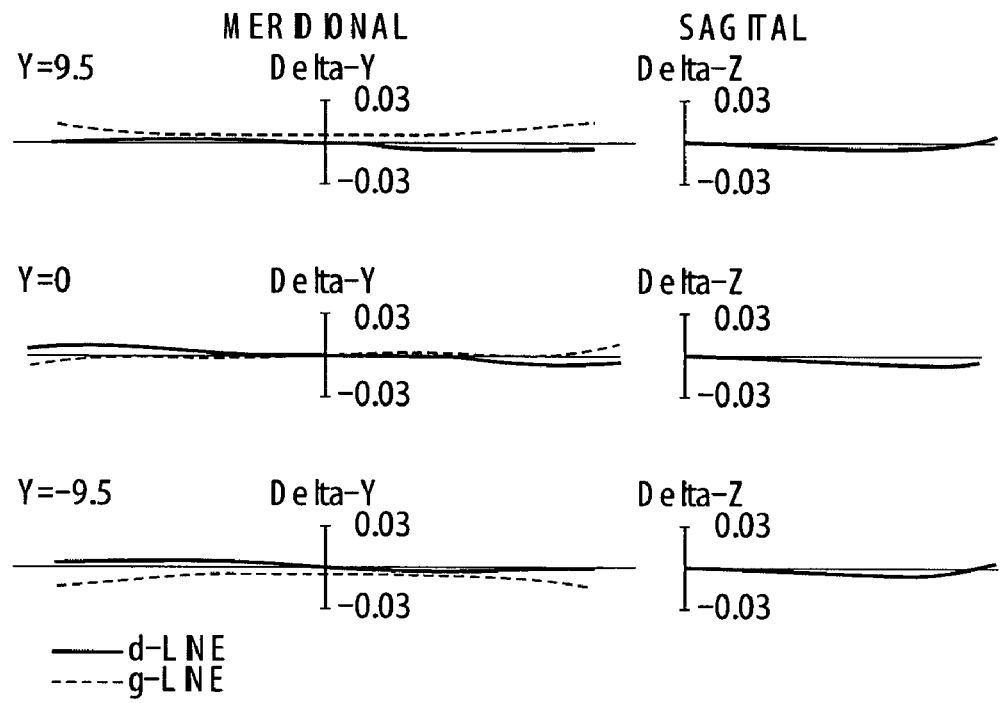
FIG. 3 illustrates diagrams of longitudinal aberrations in a reference state of the zoom lens according to exemplary embodiment 1.
Figure 3B:
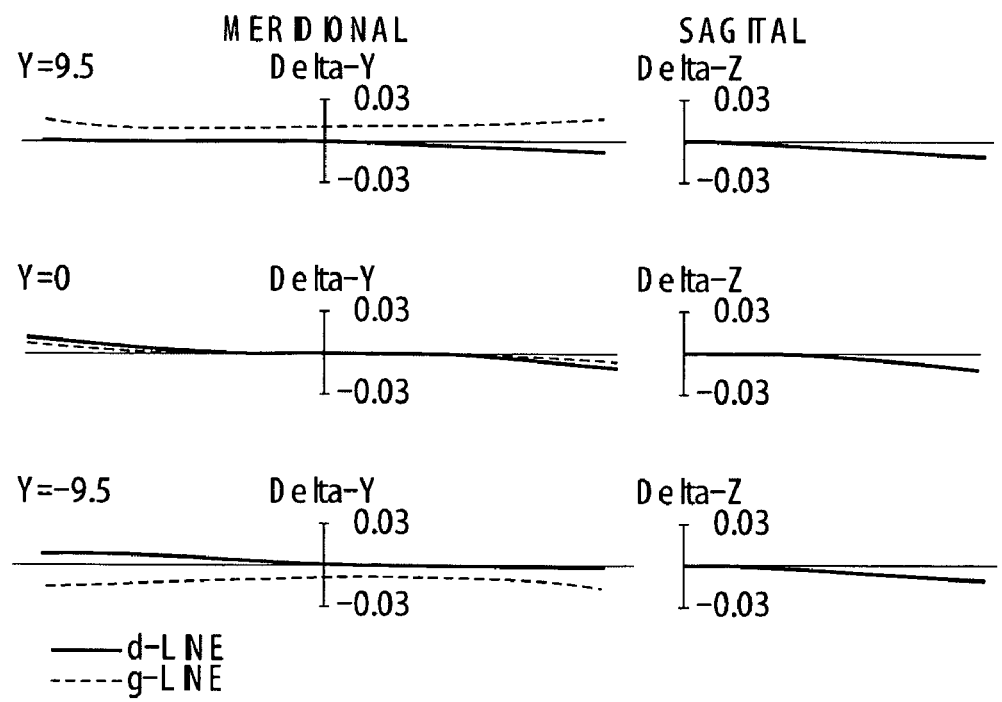

FIGS. 3A, 3B, 3C illustrate diagrams showing longitudinal aberrations in reference states (image stabilizing lens unit is not displaced) in the wide angle end, the intermediate zoom position, and the telephoto end of the zoom lens respectively, according to exemplary embodiment 1.

Figure 4A:
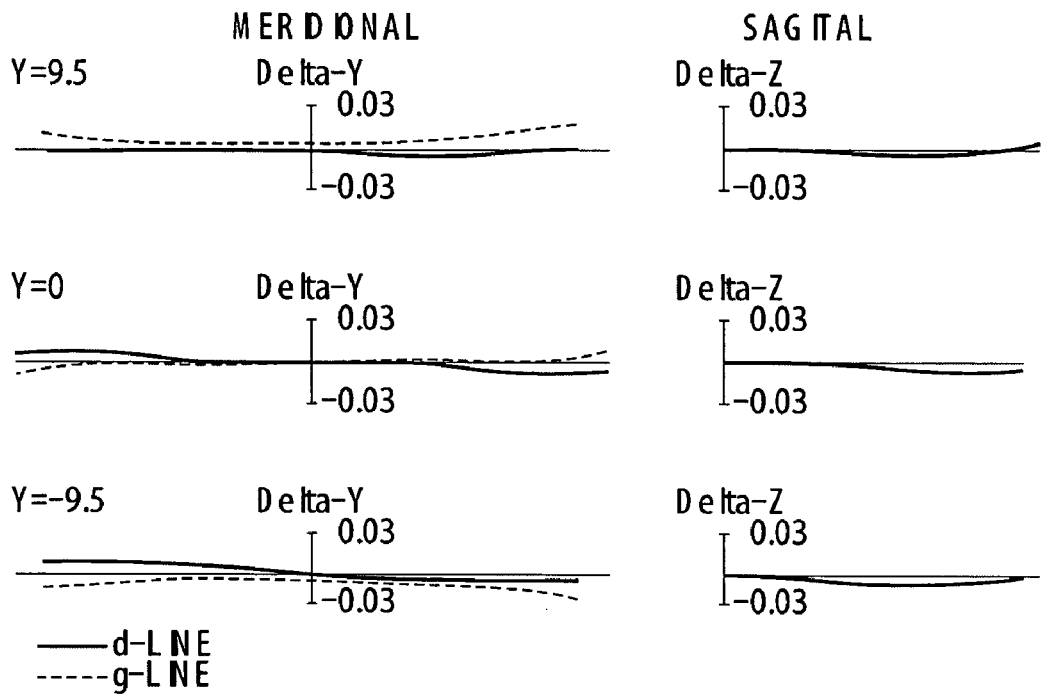
FIG. 4 illustrates diagrams of the longitudinal aberrations during image stabilizing in the zoom lens according to exemplary embodiment 1.
Figure 4B:
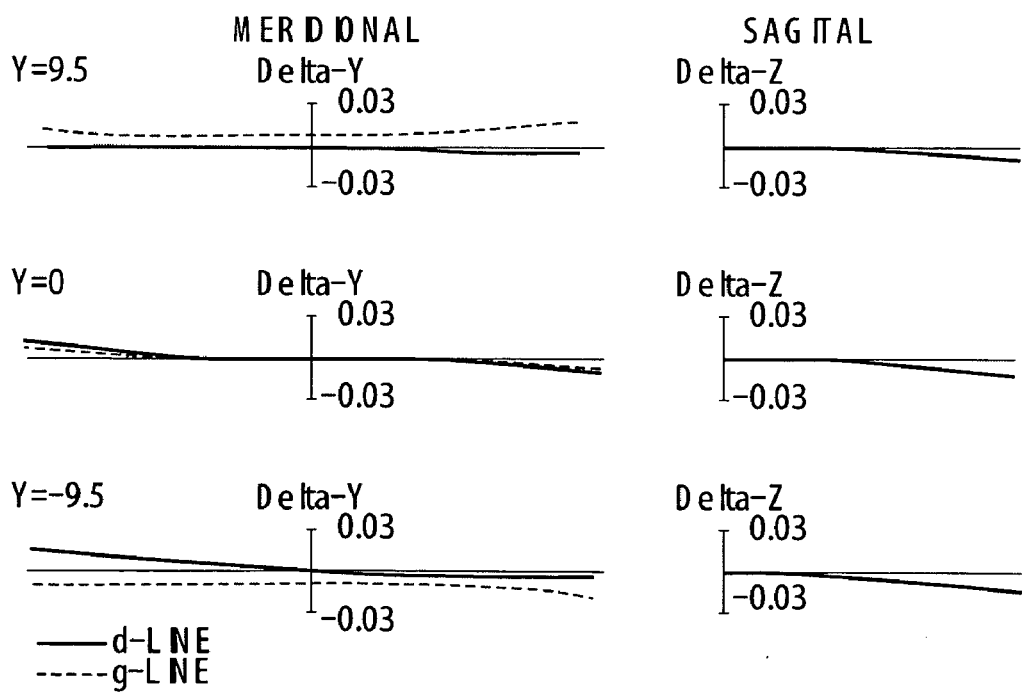

FIGS. 4A, 4B, 4C illustrate diagrams showing the longitudinal aberrations in a state in which an image is stabilized (image position is displaced) by an amount corresponding to an angle of view of 0.3° in the wide angle end, the intermediate zoom position, and the telephoto end of the zoom lens respectively, according to exemplary embodiment 1.

FIGS. 5A, 5B, 5C illustrate lens sectional views in the wide angle end, the intermediate zoom position, and the telephoto end of the zoom lens respectively, according to exemplary embodiment 2.

FIGS. 6A, 6B, 6C illustrate diagrams showing the lateral aberrations in the wide angle end, the intermediate zoom position, and the telephoto end of the zoom lens respectively, according to exemplary embodiment 2.

Figure 7A:
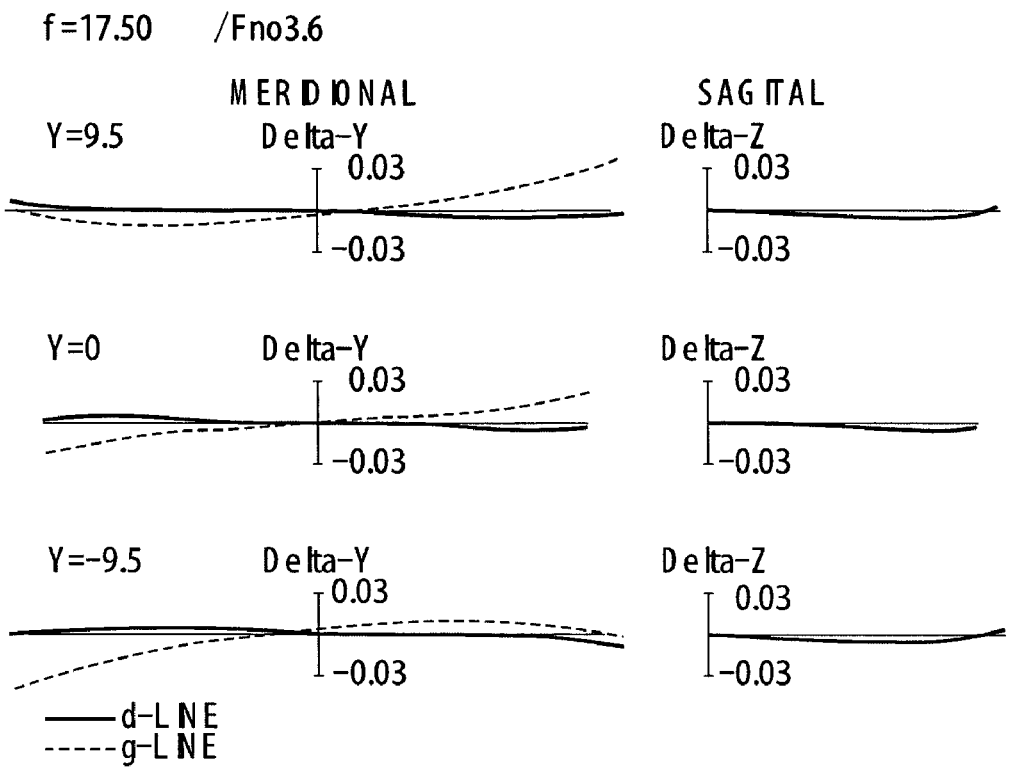
FIG. 7 illustrates diagrams of the longitudinal aberrations in the reference state of the zoom lens according to exemplary embodiment 2.
Figure 7B:
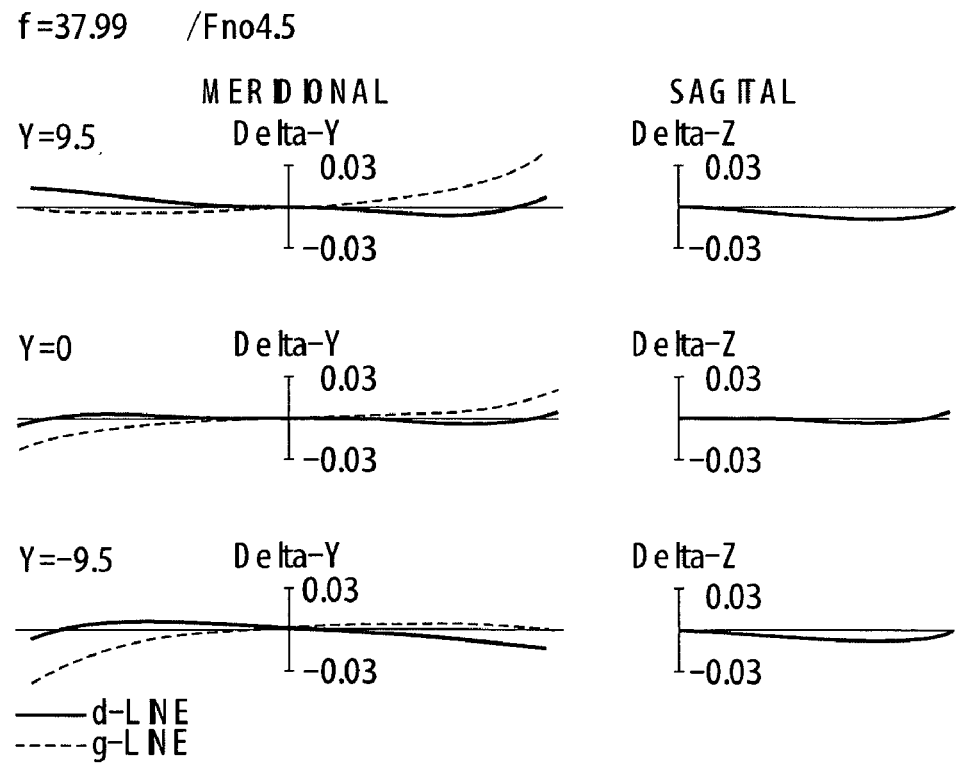

FIGS. 7A, 7B, 7C illustrate diagrams showing the longitudinal aberrations in the reference states in the wide angle end, the intermediate zoom position, and the telephoto end of the zoom lens respectively, according to exemplary embodiment 2.

Figure 8A:
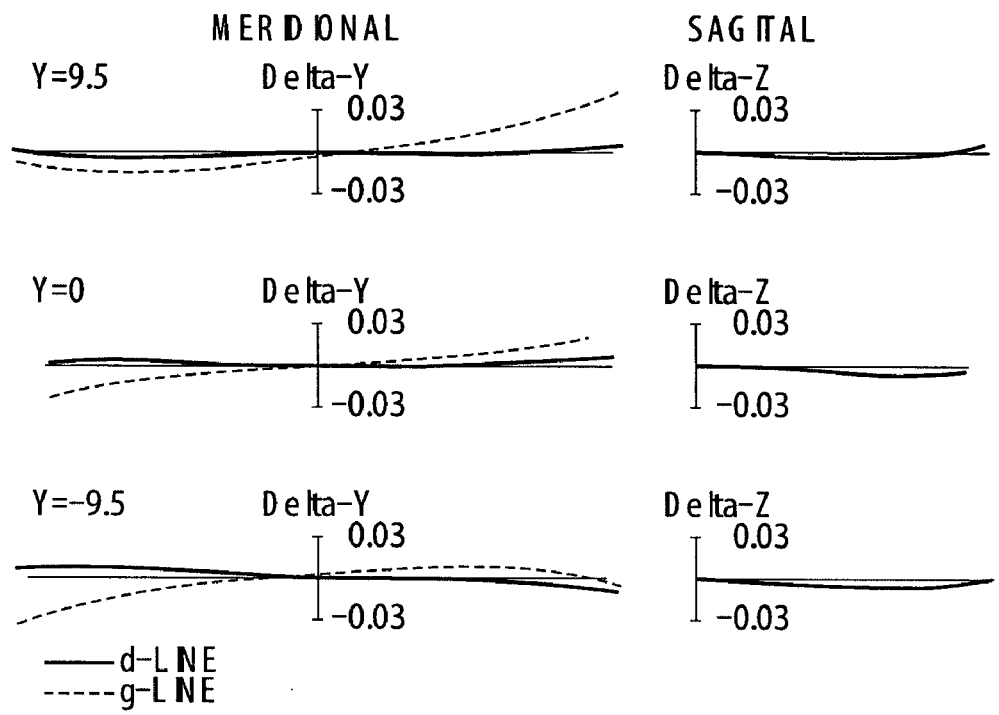
FIG. 8 illustrates diagrams of the longitudinal aberrations during the image stabilizing in the zoom lens according to exemplary embodiment 2.
Figure 8B:
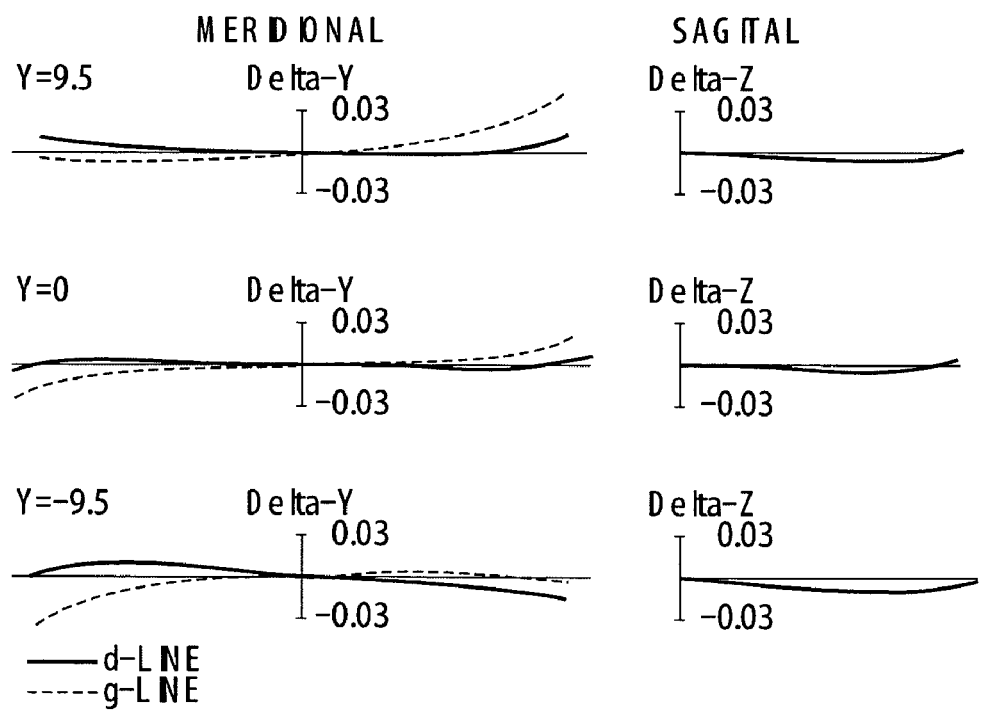
Figure 8C:
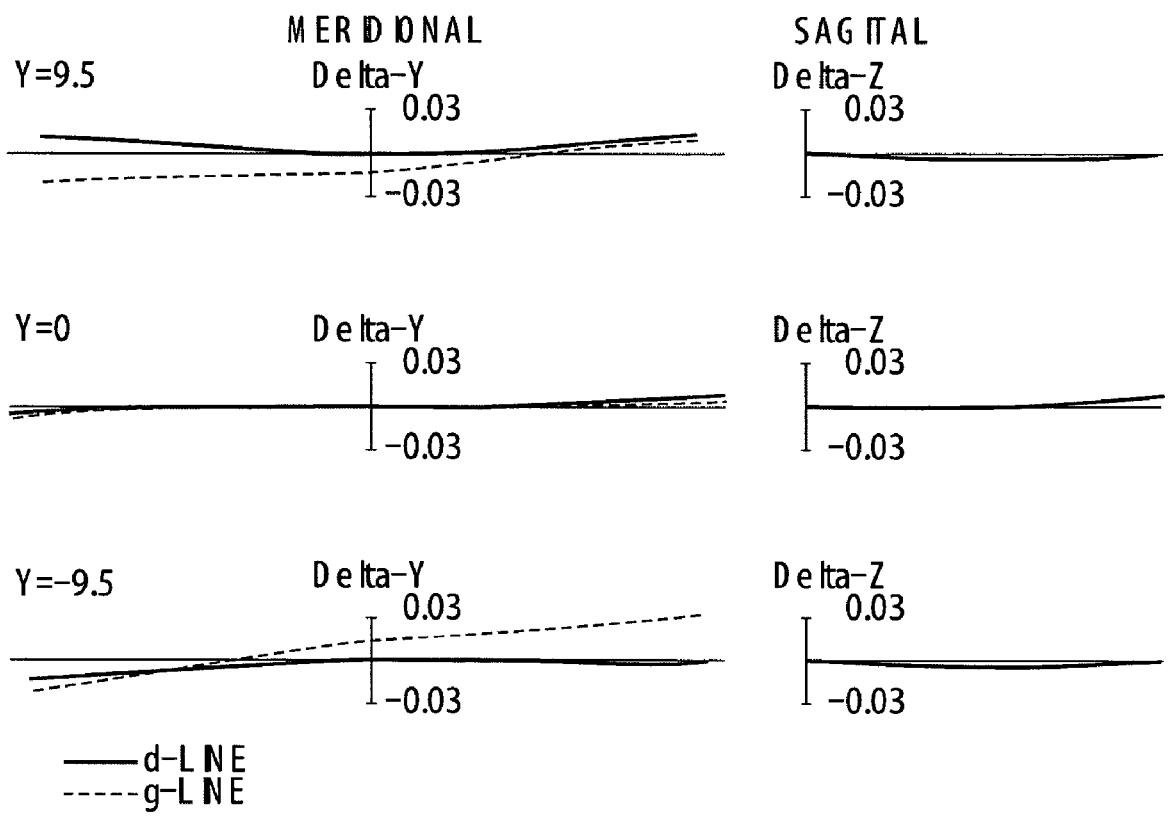

FIGS. 8A, 8B, 8C illustrate diagrams showing the longitudinal aberrations in the state in which the image is stabilized by the amount corresponding to an angle of view of 0.3° in the wide angle end, the intermediate zoom position, and the telephoto end of the zoom lens respectively, according to exemplary embodiment 2.

FIGS. 9A, 9B, 9C illustrate lens sectional views in the wide angle end, the intermediate zoom position, and the telephoto end of the zoom lens respectively, according to exemplary embodiment 3.

Figure 10A:
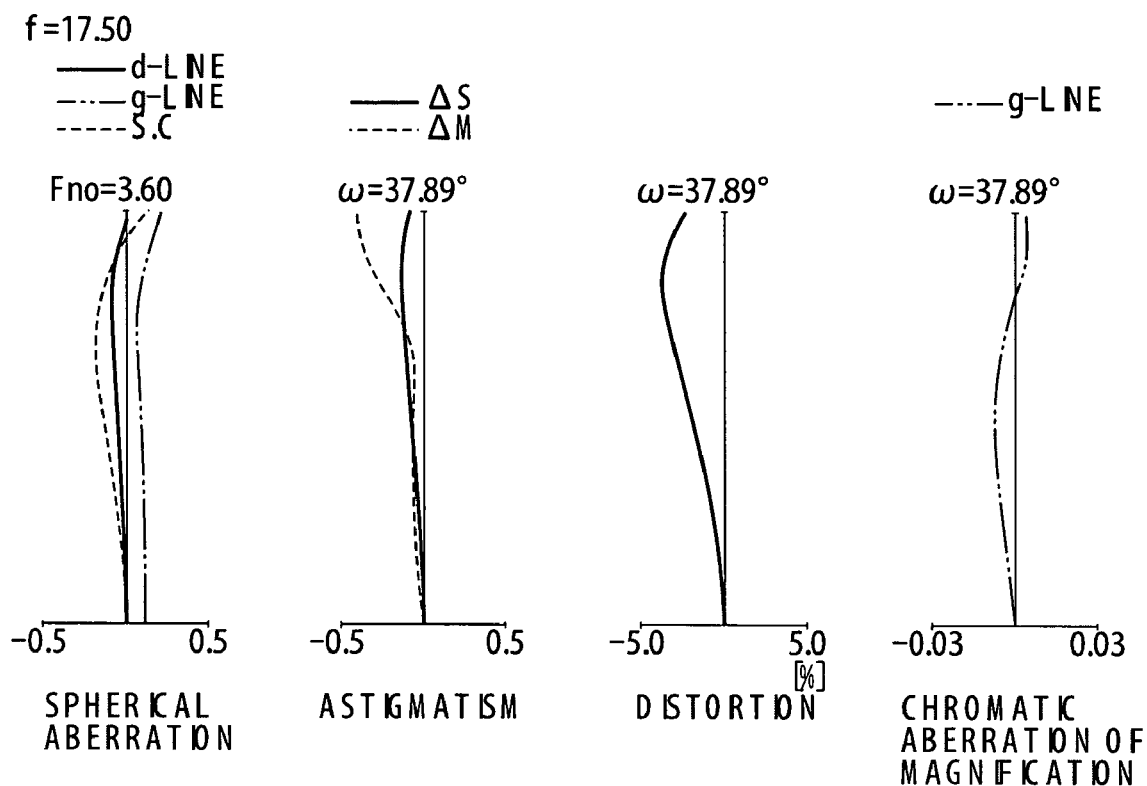
FIG. 10 illustrates diagrams of the lateral aberrations of the zoom lens according to exemplary embodiment 3.
Figure 10B:
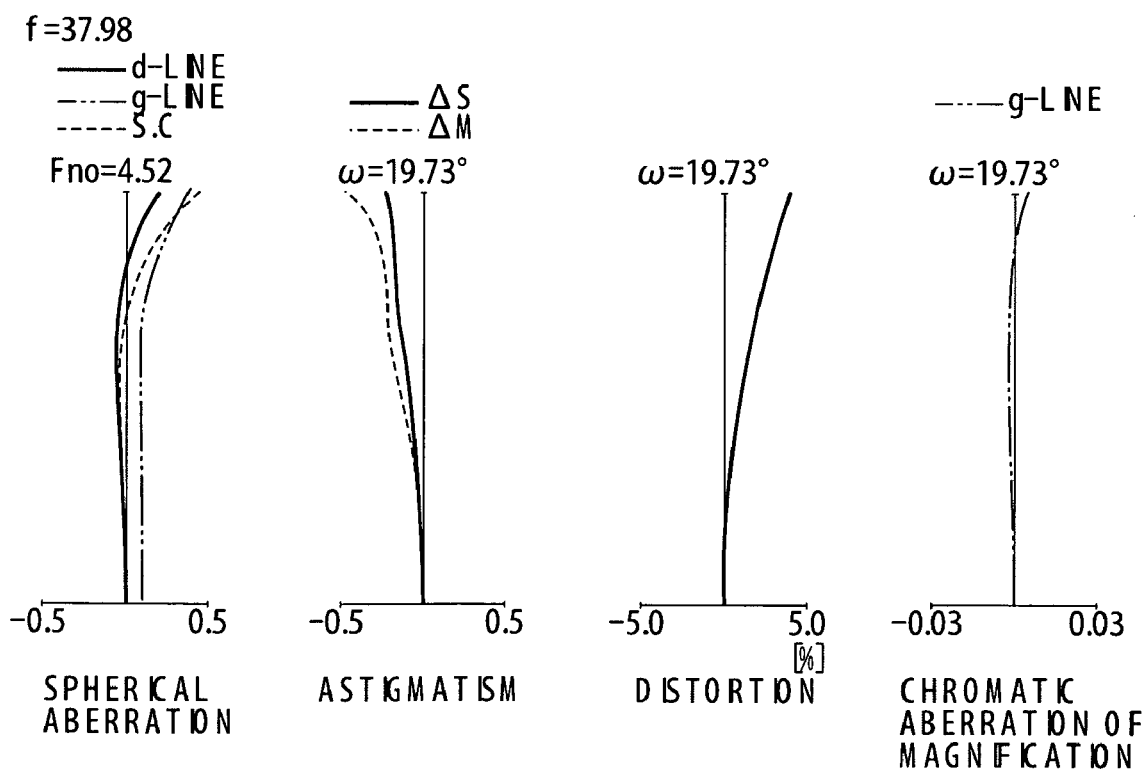
Figure 10C:
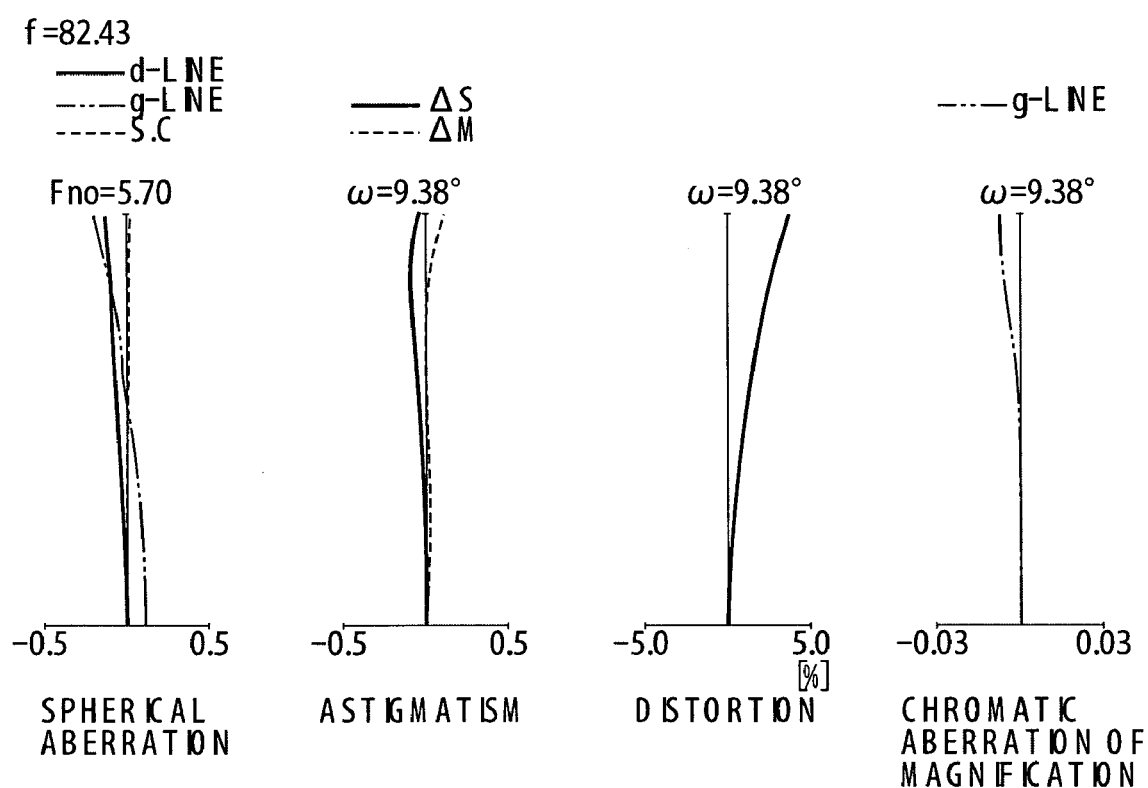

FIGS. 10A, 10B, 10C illustrate diagrams showing the lateral aberrations in the wide angle end, the intermediate zoom position, and the telephoto end of the zoom lens respectively, according to exemplary embodiment 3.

Figure 11A:
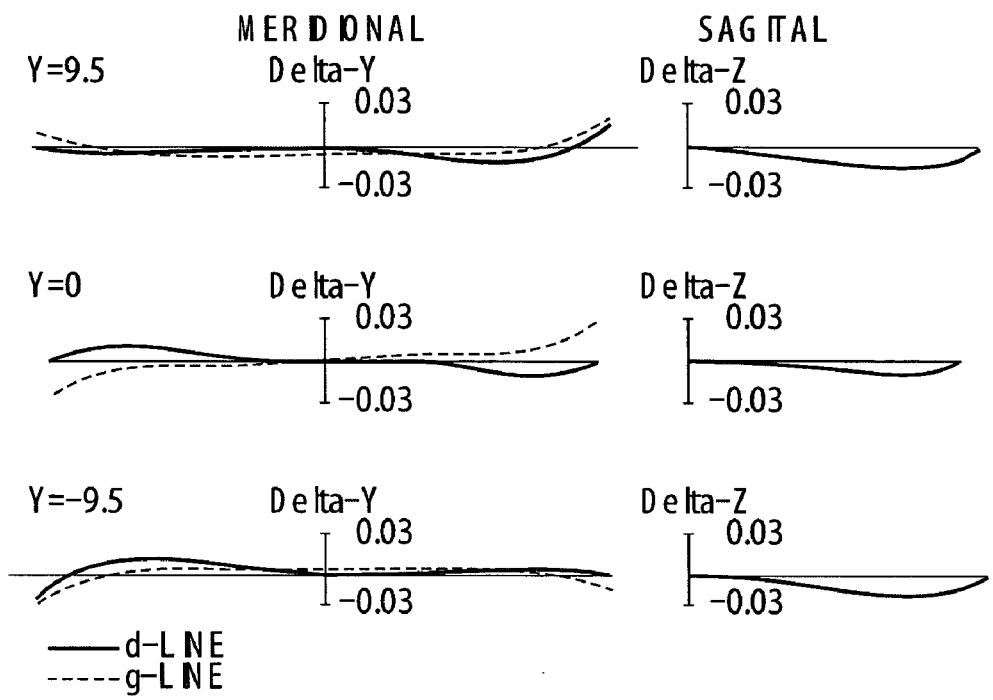
FIG. 11 illustrates diagrams of the longitudinal aberrations in the reference state of the zoom lens according to exemplary embodiment 3.
Figure 11B:
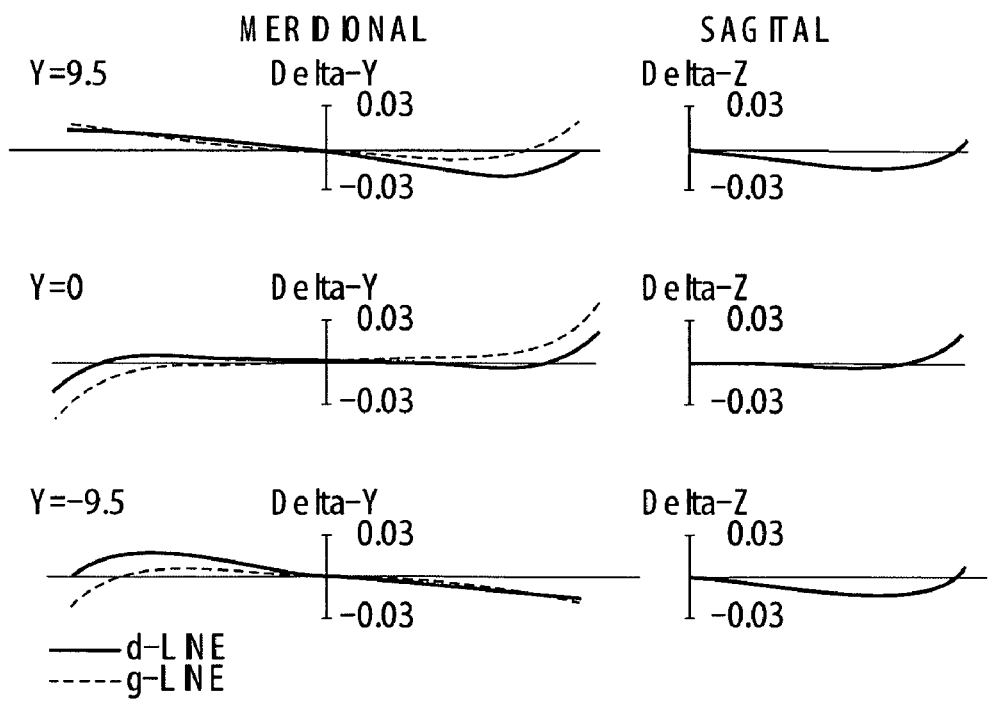
Figure 11C:
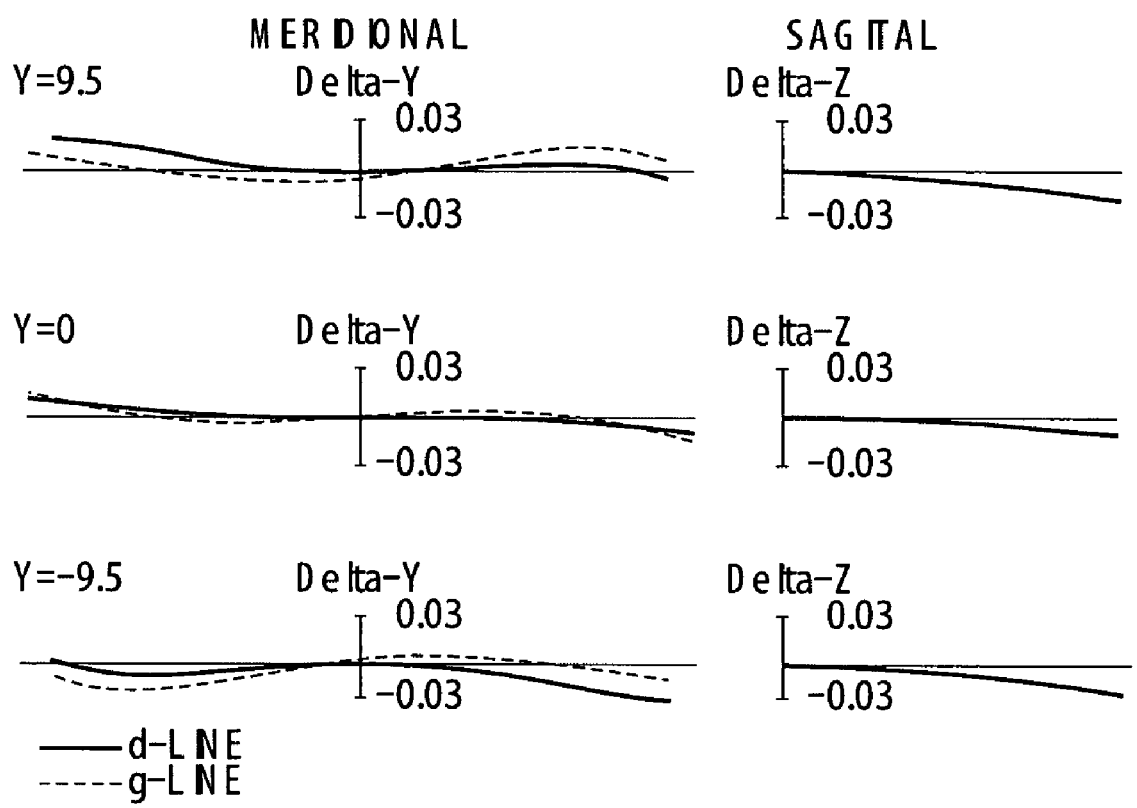

FIGS. 11A, 11B, 11C illustrate diagrams showing the longitudinal aberrations in the reference states in the wide angle end, the intermediate zoom position, and the telephoto end of the zoom lens respectively, according to exemplary embodiment 3.

Figure 12A:
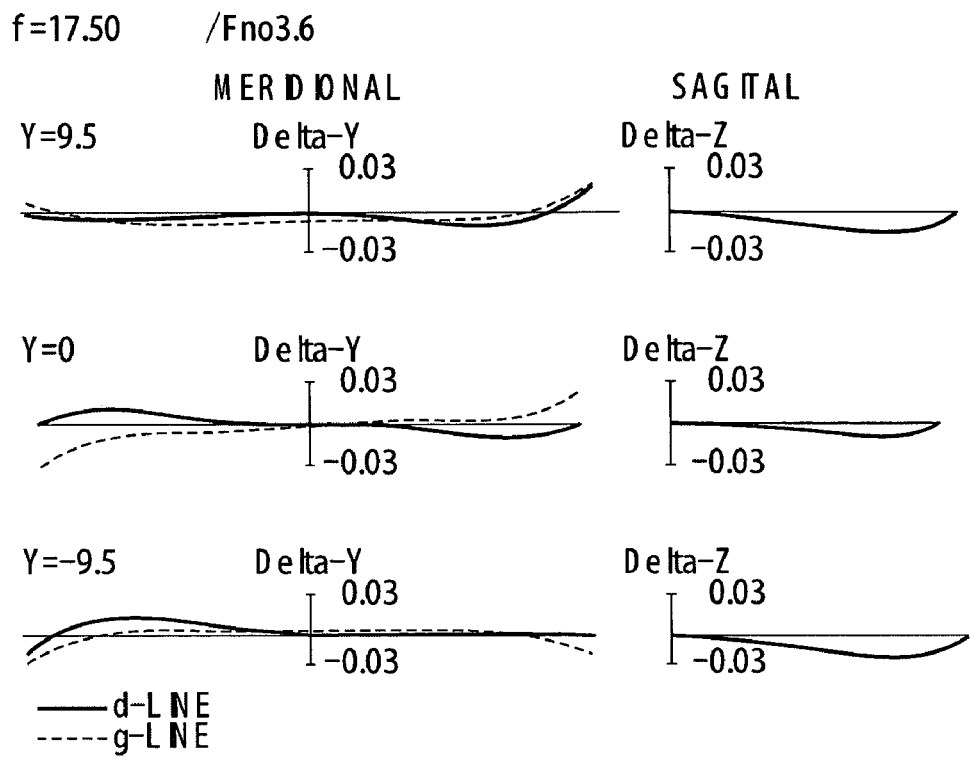
FIG. 12 illustrates diagrams of the longitudinal aberrations during the image stabilizing in the zoom lens according to exemplary embodiment 3.
Figure 12B:
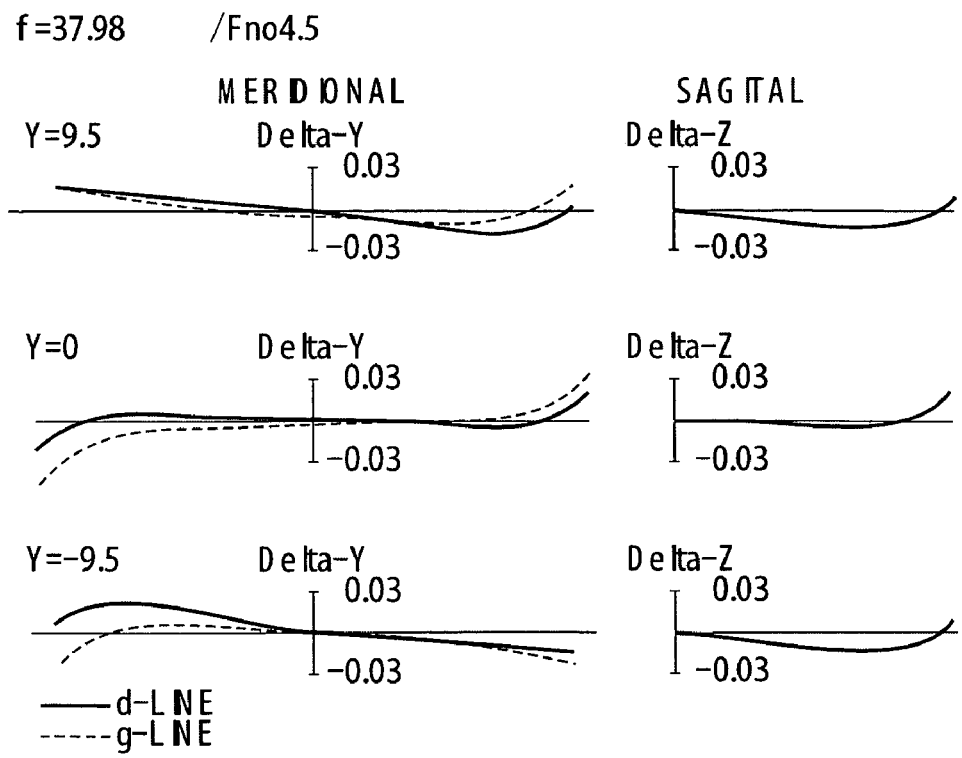
Figure 12C:
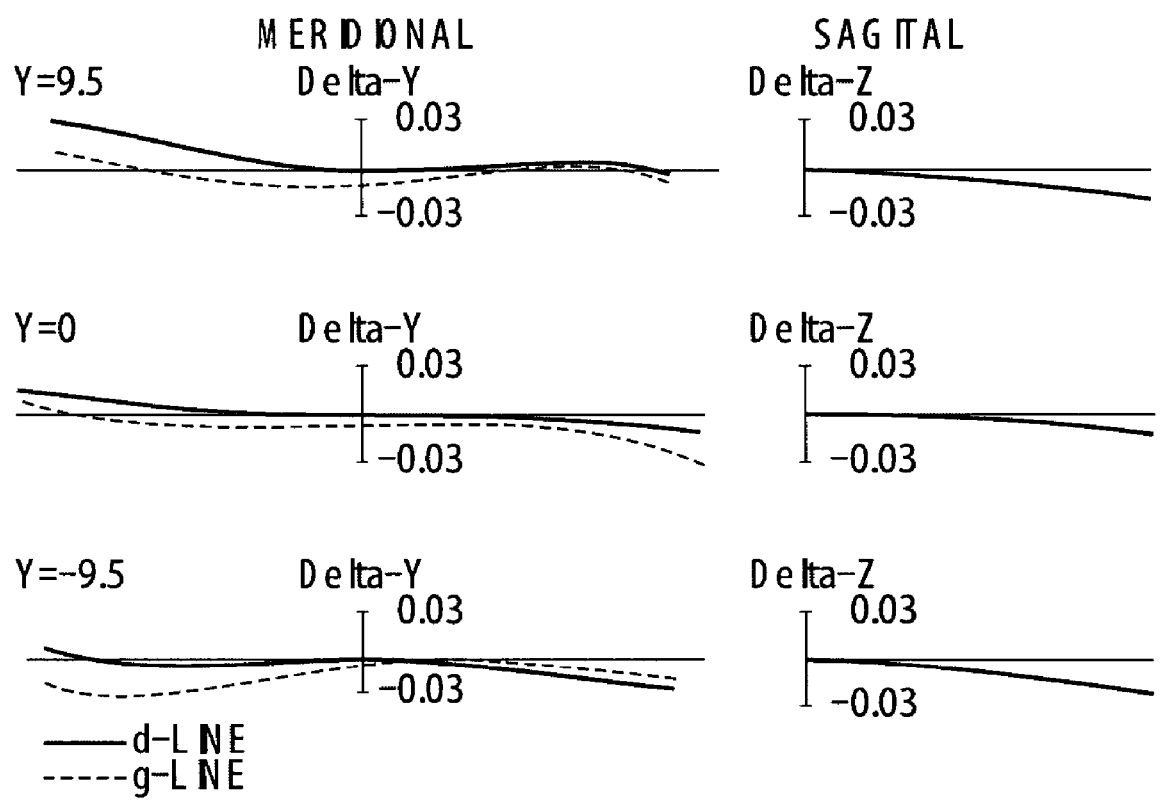

FIGS. 12A, 12B, 12C illustrate diagrams showing the longitudinal aberrations in the state in which the image is stabilized by the amount corresponding to an angle of view of 0.3° in the wide angle end, the intermediate zoom position, and the telephoto end of the zoom lens respectively, according to exemplary embodiment 3.

FIGS. 13A, 13B, 13C illustrate lens sectional views in the wide angle end, the intermediate zoom position, and the telephoto end of the zoom lens respectievly, according to exemplary embodiment 4.

Figure 14A:
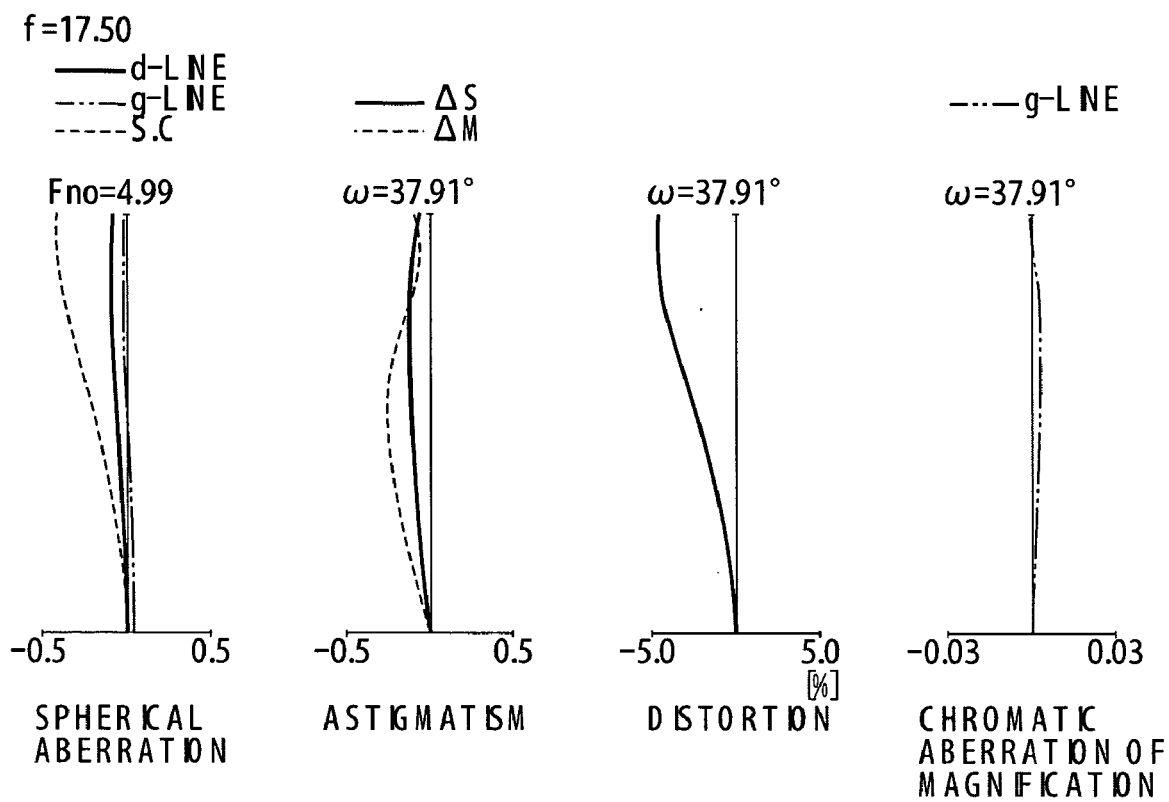
FIG. 14 illustrates diagrams of the lateral aberrations of the zoom lens according to exemplary embodiment 4.
Figure 14B:
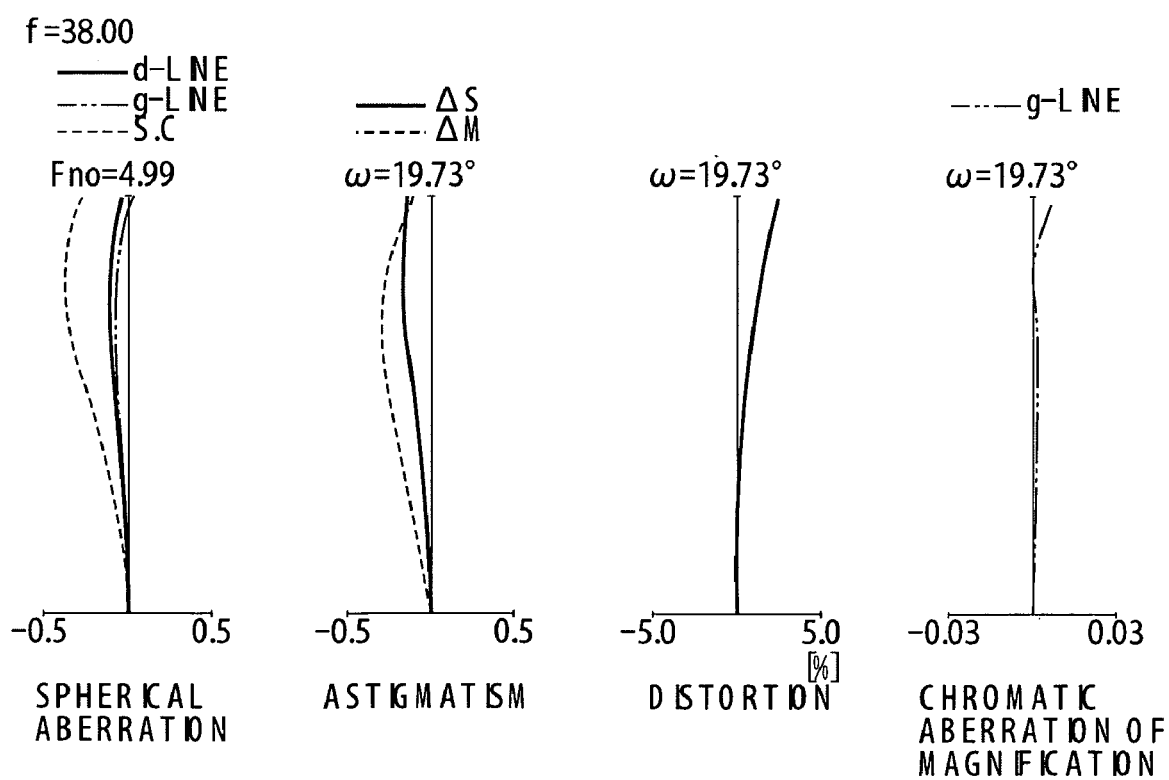
Figure 14C:
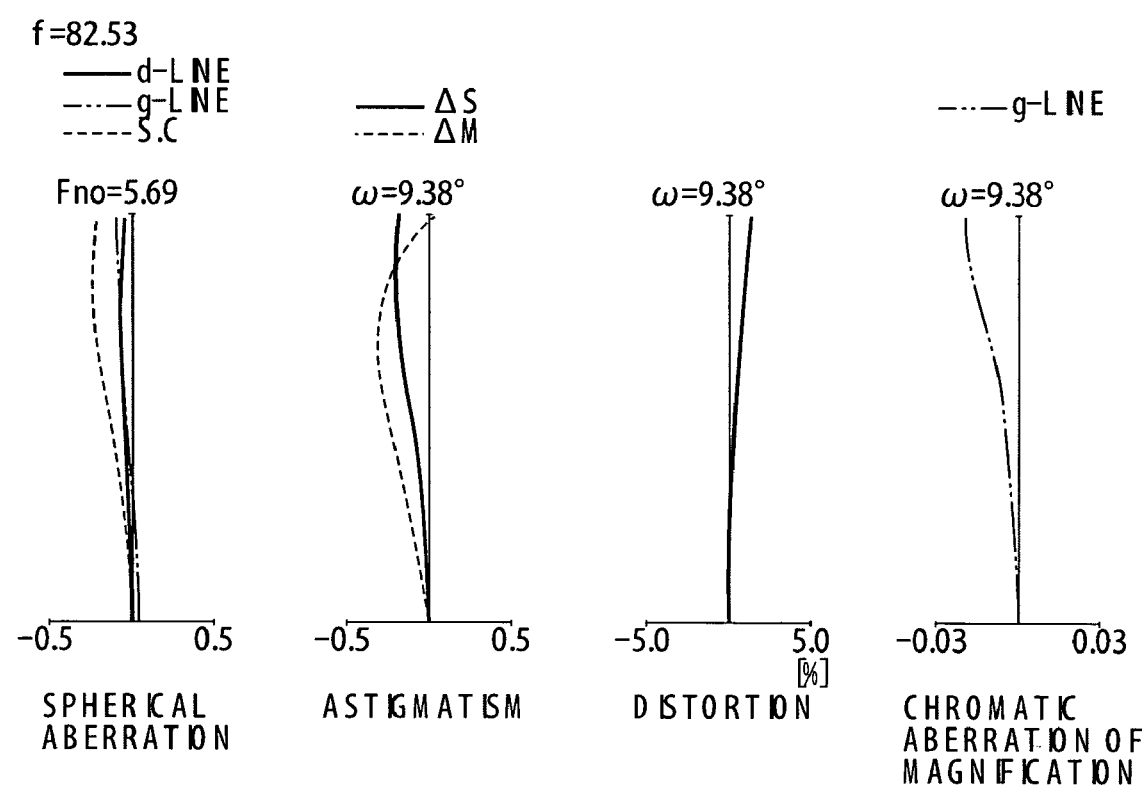

FIGS. 14A, 14B, 14C illustrate diagrams showing the lateral aberrations in the wide angle end, the intermediate zoom position, and the telephoto end of the zoom lens respectievly, according to exemplary embodiment 4.

Figure 15A:
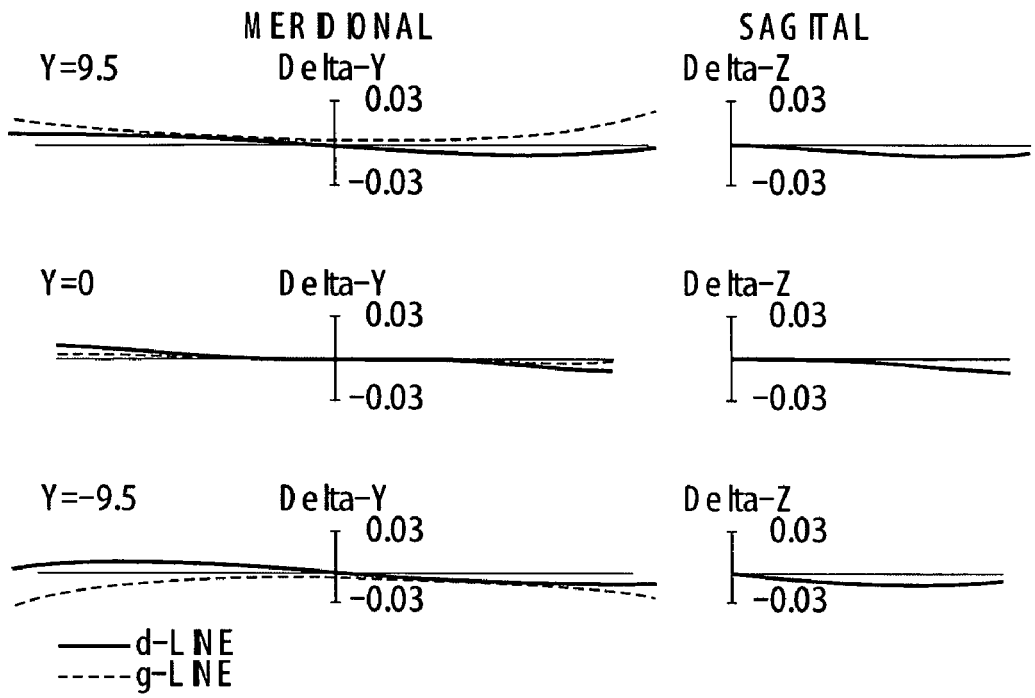
FIG. 15 illustrates diagrams of the longitudinal aberrations in the reference state of the zoom lens according to exemplary embodiment 4.
Figure 15B:
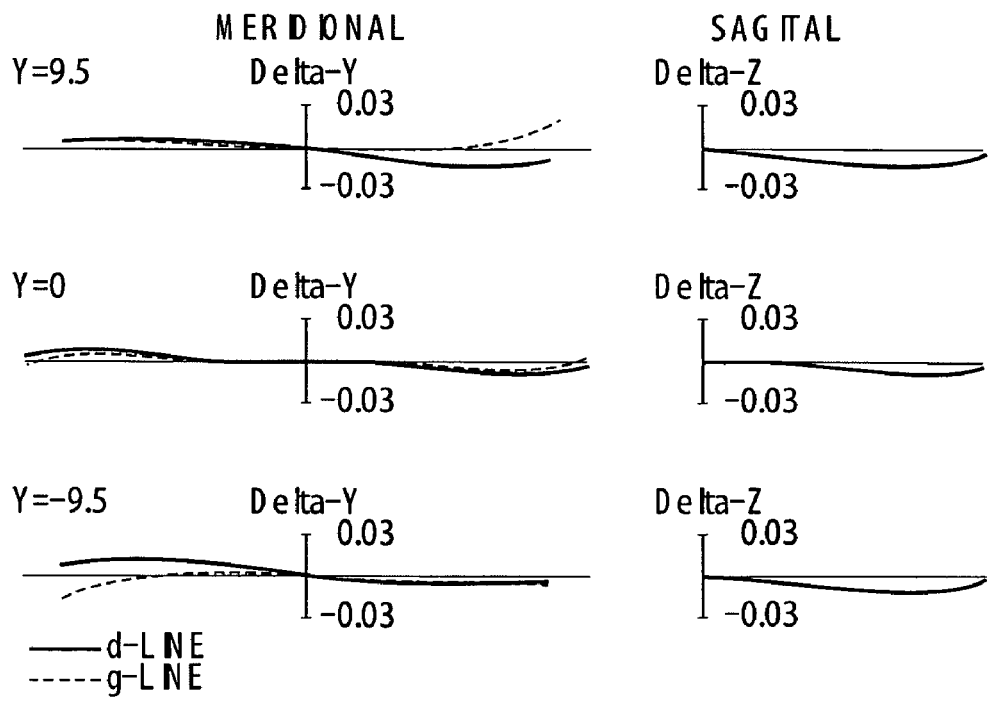
Figure 15C:
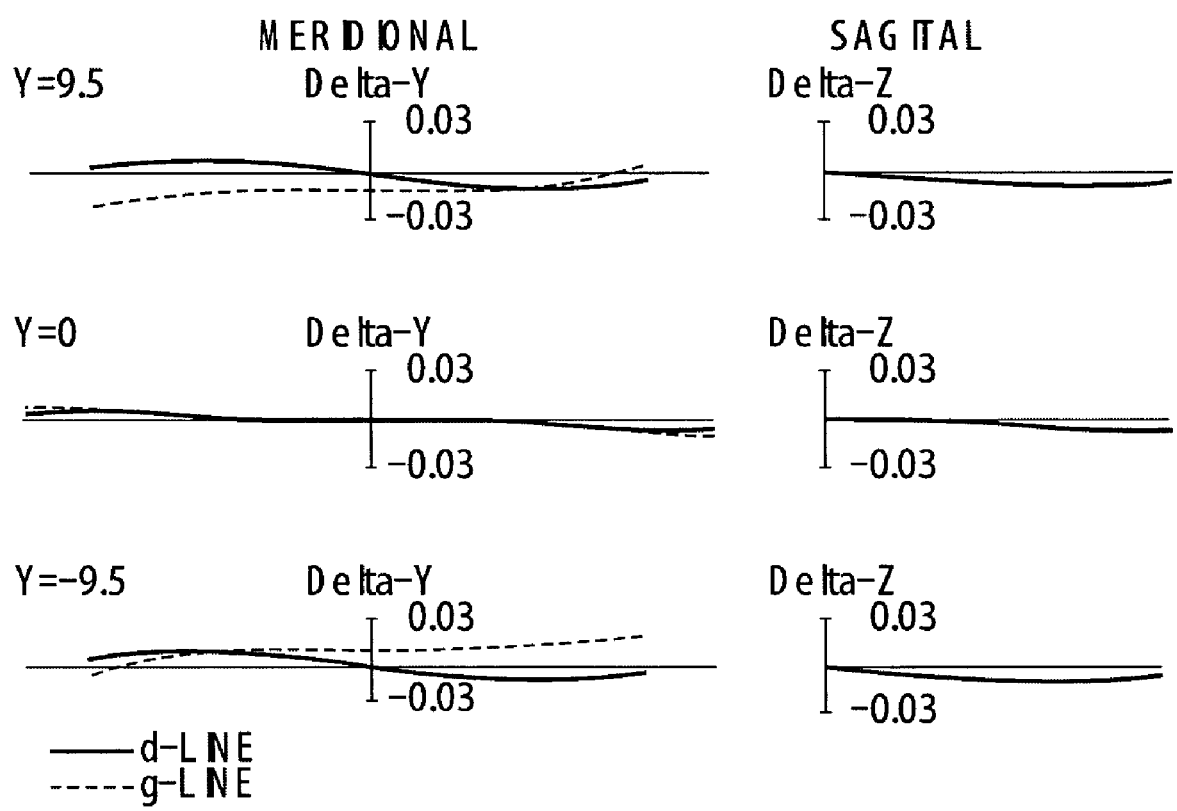

FIGS. 15A, 15B, 15C illustrate diagrams showing the longitudinal aberrations in the reference states in the wide angle end the intermediate zoom position, and the telephoto end of the zoom lens respectively, according to exemplary embodiment 4.

Figure 16A:
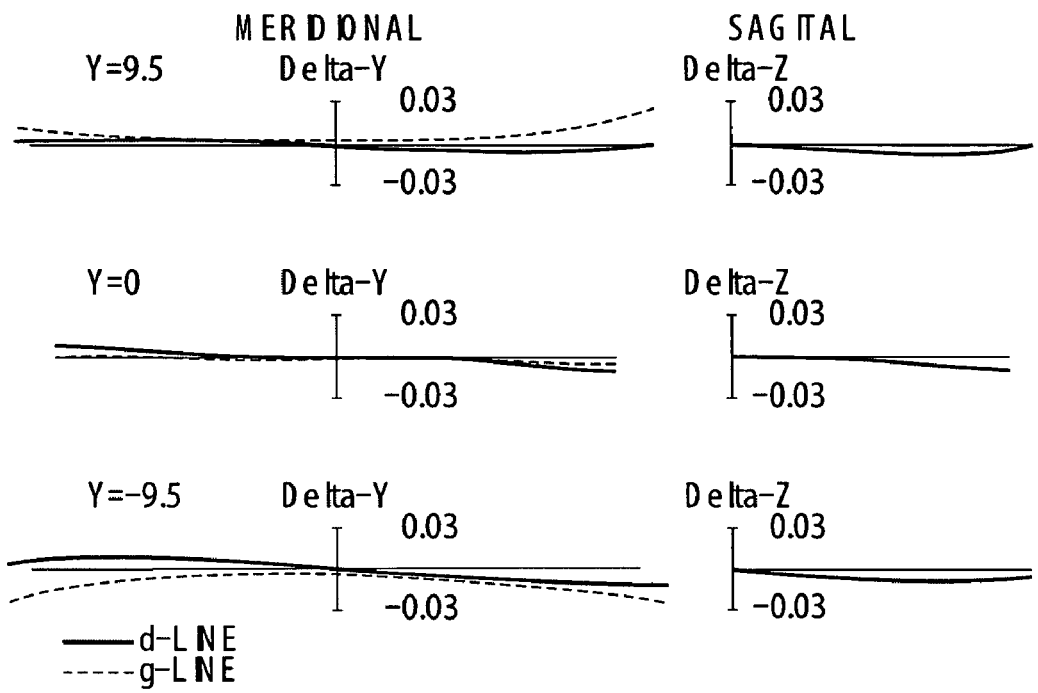
FIG. 16 illustrates diagrams of the longitudinal aberrations during the image stabilizing in the zoom lens according to exemplary embodiment 4.
Figure 16B:
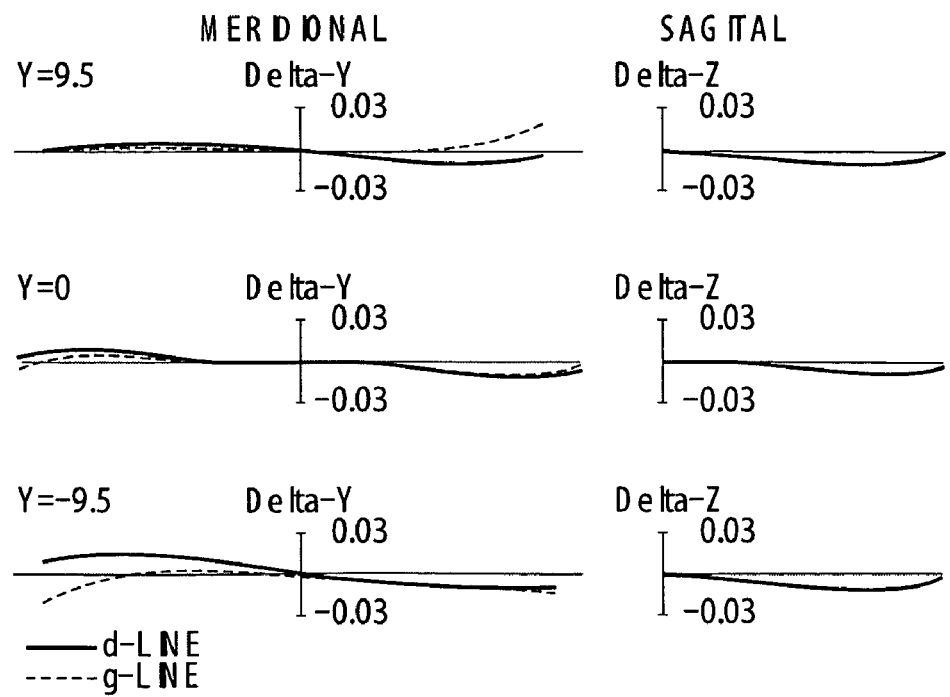

FIGS. 16A, 16B, 16C illustrate diagrams showing the longitudinal aberrations in the state in which the image is stabilized by the amount corresponding to an angle of view of 0.3° in the wide angle end, the intermediate zoom position, and the telephoto end of the zoom lens respectively, according to exemplary embodiment 4.

The longitudinal aberration diagrams in the image stabilizing states shown in FIGS. 4, 8, 12, 16 illustrate aberration diagrams in a state in which an image stabilizing lens unit is moved vertically downwards as viewed in the lens sectional view.

Figure 17:
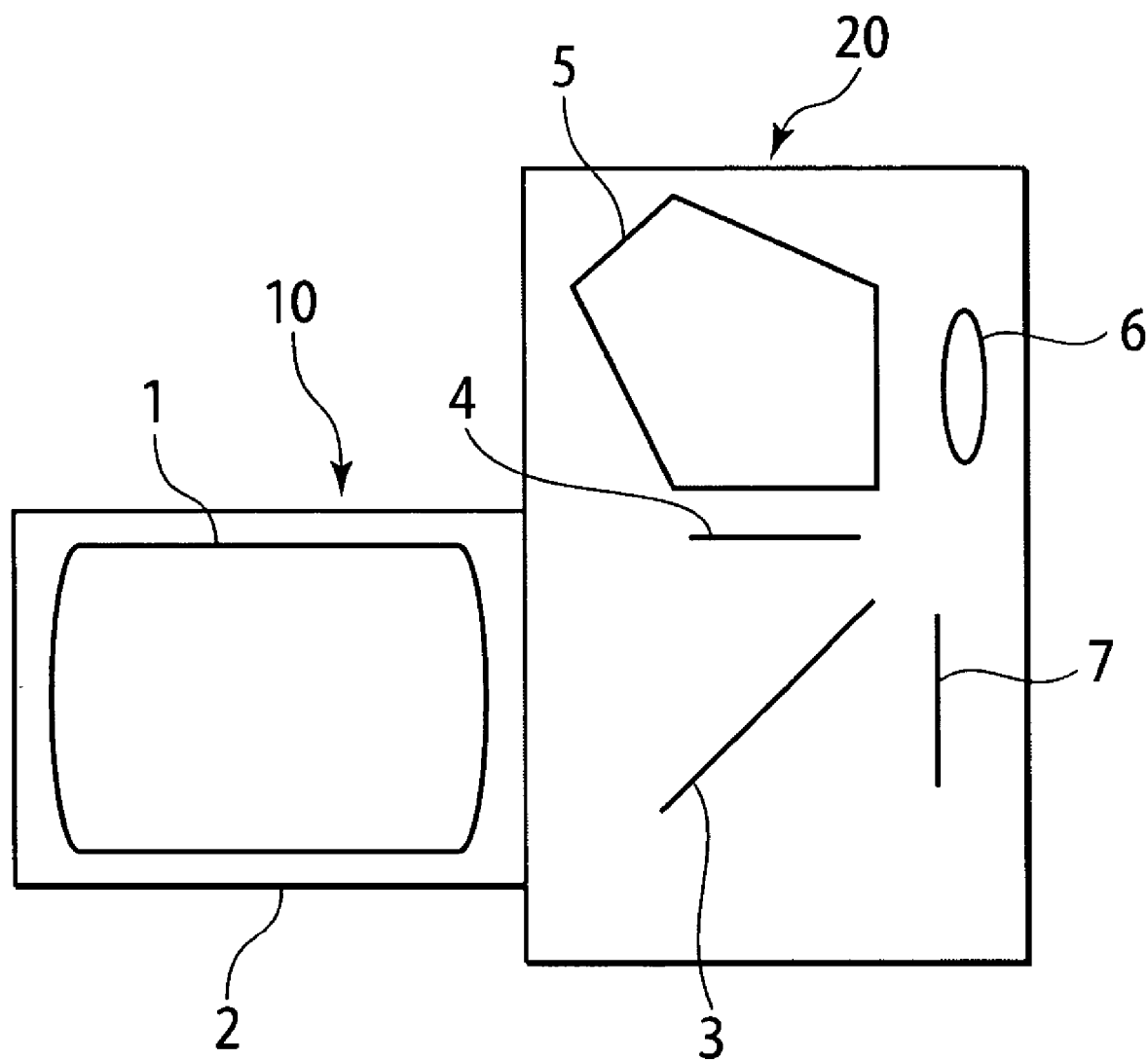
FIG. 17 is a schematic diagram of a major part of an image pickup apparatus according to at least one exemplary embodiment.

FIG. 17 illustrates a schematic diagram of a major part of a single-lens reflex camera (image pickup apparatus) provided with a zoom lens system according to at least one exempalry embodiment.

Figure 18:
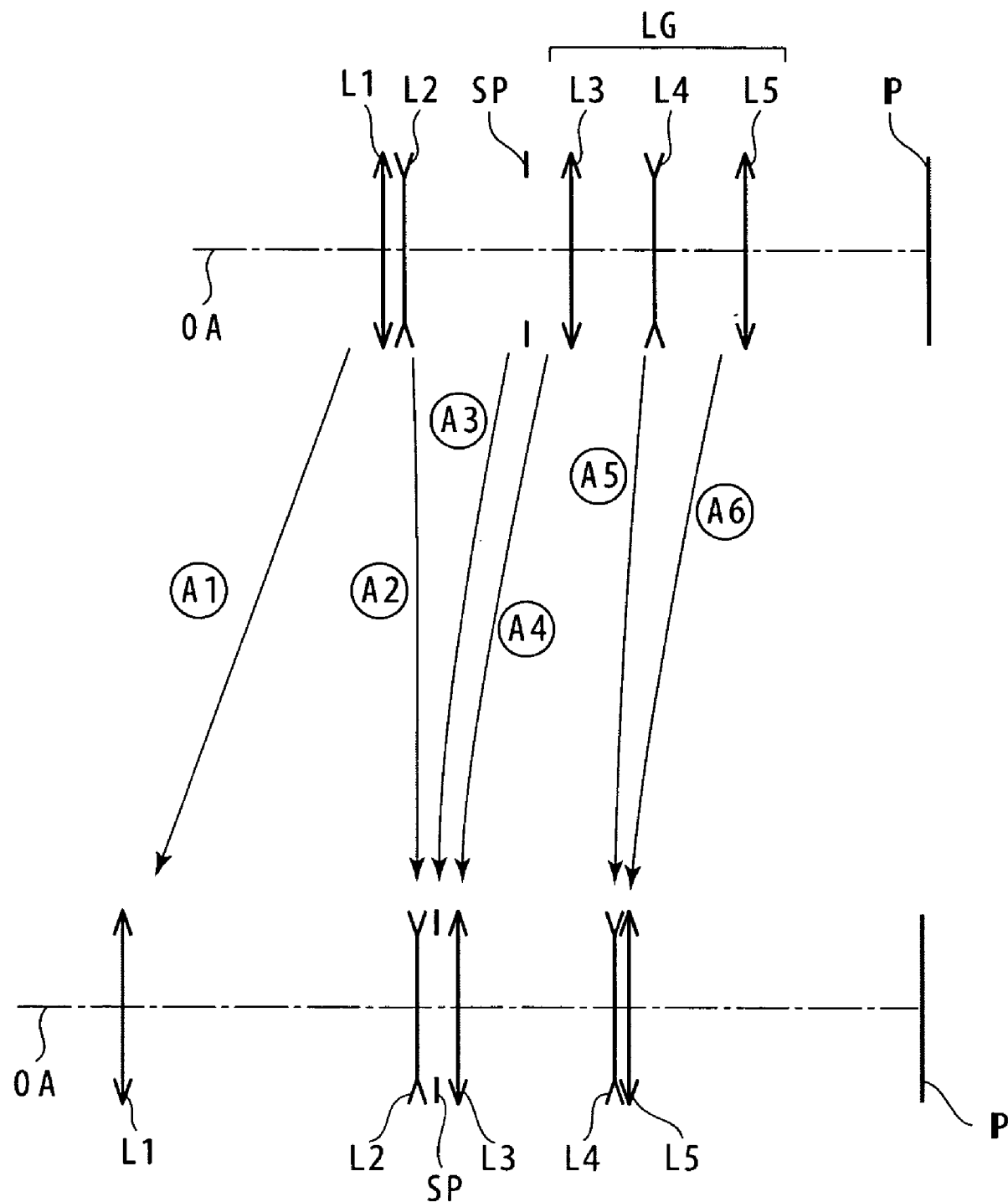
FIG. 18 illustrates a diagram showing movement loci of lens units during the zooming of the zoom lens according to exemplary embodiment 1.

FIG. 18 illustrates movement loci of lens units during the zooming from the wide angle end to the telephoto end of the zoom lens according to exemplary embodiment 1.

Figure 19:
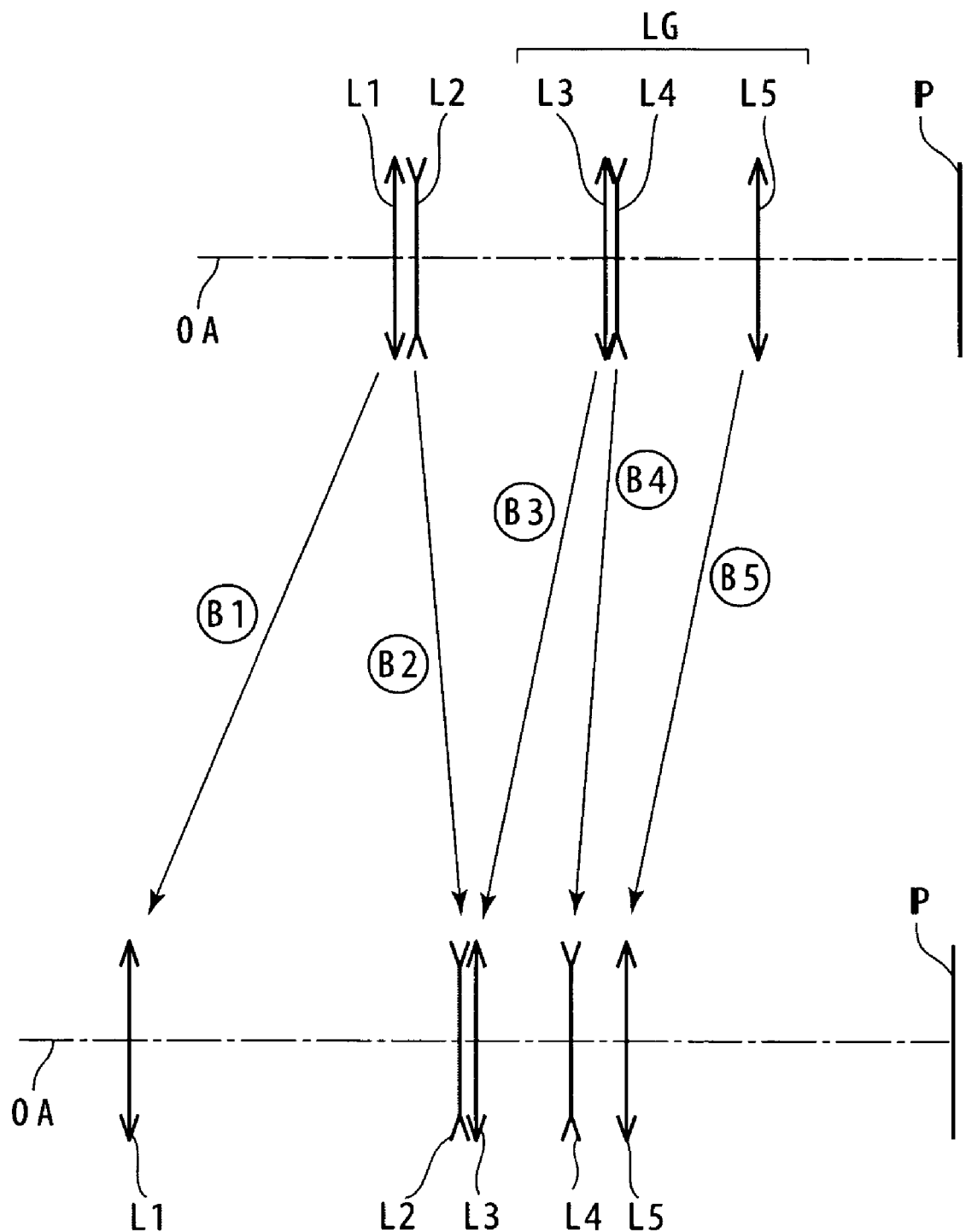
FIG. 19 illustrates a diagram showing the movement loci of the respective lens units during the zooming of the zoom lens according to exemplary embodiment 2.

FIG. 19 illustrates the movement loci of the respective lens units during the zooming from the wide angle end to the telephoto end of the zoom lens according to exemplary embodiment 2.

Figure 20:
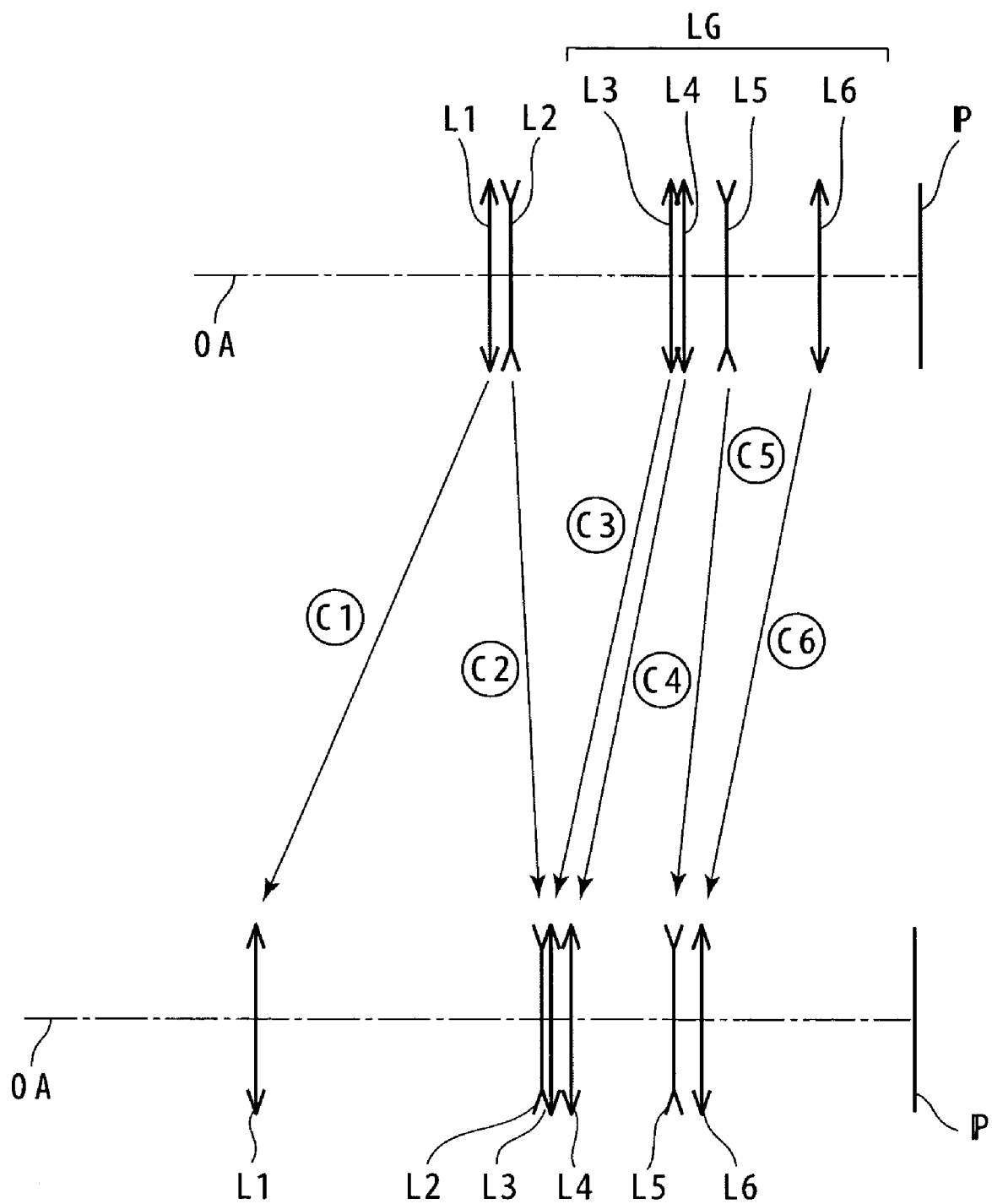
FIG. 20 illustrates a diagram showing the movement loci of the respective lens units during the zooming of the zoom lens according to exemplary embodiment 3.

FIG. 20 illustrates the movement loci of the respective lens units during the zooming from the wide angle end to the telephoto end of the zoom lens according to exemplary embodiment 3.

Figure 21:
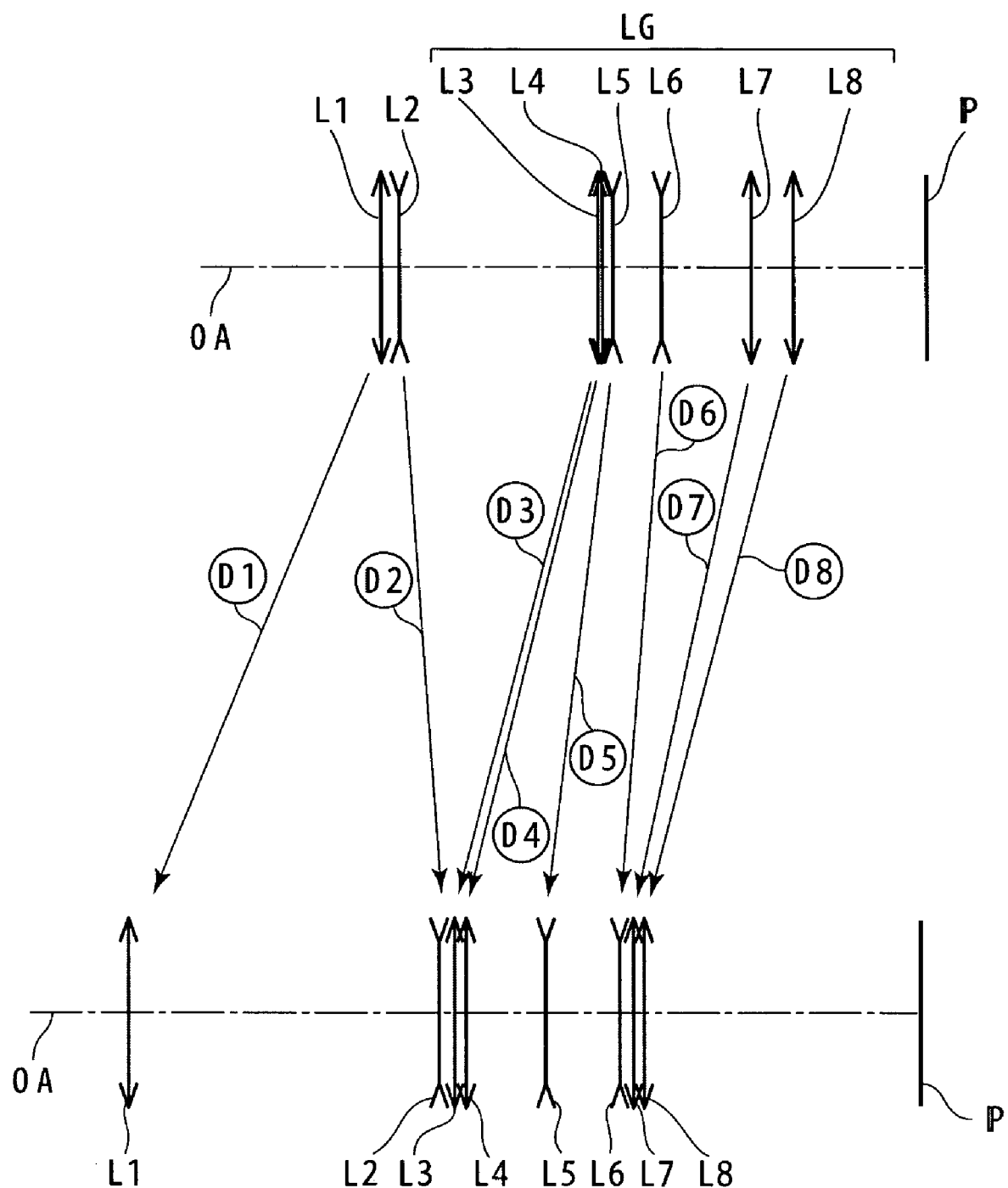
FIG. 21 illustrates a diagram showing the movement loci of the respective lens units during the zooming of the zoom lens according to exemplary embodiment 4.

FIG. 21 illustrates the movement loci of the respective lens units during the zooming from the wide angle end to the telephoto end of the zoom lens according to exemplary embodiment 4.

In at least one exemplary embodiment, the lens sectional view, the left side is an object side (front side), and the right side is an image side (rear side). The zoom lens in at least one exemplary embodiment is a photographic lens system for use in the image pickup apparatus. In the lens sectional view, Li denotes an i-th lens unit which is a unit of lenses integrally moving during the zooming. Here, i denotes an order of the lens units counted from the object side, and LG denotes a lens group having a plurality of lens units and having a positive refractive power as a whole in an entire zoom range.

Moreover, IP denotes an image plane. When the zoom lens system of at least one exemplary embodiment is used as an optical photographic system of a video camera or a digital still camera, IP denotes an image pickup surface of a solid image pickup device (e.g., photoelectric conversion device, a CCD sensor, a CMOS sensor, other image pickup devices as known by one of ordinary skill in the relevant art and equivalents). When the system is used as a photographic optical system of a non-digital camera (e.g., one using a silver salt film), IP denotes a photosensitive surface (e.g., a film surface).

Furthermore, SP denotes an aperture stop. The aperture stop SP can be positioned on the object side of the third lens unit L3 in at least a few of the exemplary embodiments. The aperture stop SP moves integrally with or independently of the third lens unit L3 during the zooming.

In each aberration diagram, d, g denote d and g lines, respectively, S. C denotes sinusoidal conditions, and ΔM, ΔS denote a meridional image plane, and a sagittal image plane, respectively. A chromatic aberration of magnification is represented by a g line.

Moreover, Fno denotes F number, Ω denotes a half angle of view, and Y denotes an image height.

The zoom lens in at least one exemplary embodiment is provided with, in order from the object side to the image side, a first lens unit L1 having a positive refractive power (optical power=inverse number of focal distance), a second lens unit L2 having a negative refractive power, and a rear lens group LG having a positive refractive power as a whole in a total zoom range having a plurality of lens units. The rear lens group LG has a lens component LN having a negative refractive power such that an interval from the lens unit disposed adjacent to the component during the zooming changes. The lens component LN can have a front lens sub-component LN1 of a negative refractive power, and a rear lens sub-component LN2 of a negative refractive power. Moreover, when at least a part of either of the front lens sub-component LN1 and/or the rear lens sub-component LN2 is displaced in such a manner as to have a component in at least a vertical direction with respect to an optical axis (arranged in a horizontal direction), an image formed by the whole zoom lens system is displaced (stabilized).

In exemplary embodiments 1, 2, a fourth lens unit L4 corresponds to the lens component LN. In exemplary embodiment 3, a fifth lens unit L5 corresponds to the lens component LN. In exemplary embodiment 4, the fifth lens unit L5 corresponds to the front lens sub-component LN1, and a sixth lens unit L6 corresponds to the rear lens sub-component LN2. Moreover, a lens component obtained by combining the fifth lens unit L5 with the sixth lens unit L6 corresponds to the lens component LN.

In general, in a three-unit zoom lens comprising the lens units having a positive, negative, and positive refractive powers, when an air gap between the first and second lens units is changed during the zooming, magnification is varied mainly in the second lens unit, and the third lens unit can be moved to improve the image plane accompanying the magnification varying.

In in at least one exemplary embodiment, the third lens unit of the general three-unit zoom lens further comprises a plurality of lens units (rear lens group LG) moving along the optical axis independently of one another during the zooming. Accordingly, although the zoom lens has a high zoom ratio (e.g., about 5) a total length of the lens is reduced, and an image quality can be enhanced. That is, in the rear lens group LG, a further magnification varying function can be performed in addition to that in the second lens unit L2. Simultaneously, in the rear lens group LG, an image plane position changing with the magnification varying is finely compensated.

In at least one exemplary embodiment, the rear lens group LG has a positive refractive power as a whole, with the lens component LN having a negative refractive power in the rear lens group LG, which can also have a net large negative refractive power.

On the other hand, when an excessively large negative refractive power is applied to the image stabilizing lens unit, a high-order aberration is largely generated. As a result, optical performances can deteriorate during the time of image vibration reduction. For instances where a high precision is requested in controlling the movement of the image stabilizing lens unit, an electric or mechanical control can become difficult.

In at least one exemplary embodiment, the lens component LN can be divided into two sub-lens components of negative refractive powers, and either of the sub-lens components (e.g., the front lens sub-component LN1) can be used as the image stabilizing lens unit. Accordingly, while a strong negative refractive power is kept in the whole lens component LN, it is possible to apply to the image stabilizing lens unit a refractive power appropriate for the optical performance and drivability/controllability conditions.

In at least one exemplary embodiment, lens components LPF, LPR of a positive refractive powers are disposed on the object side and the image side of the lens component LN.

Specifically, in exemplary embodiments 1 and 2, the lens component LPF of a positive refractive power is disposed on the object side of the fourth lens unit L4 which is the lens component LN, and the lens component LPR of a positive refractive power is disposed on the image side. In exemplary embodiments 1 and 2, the lens component LPF includes the third lens unit L3 of a positive refractive power. Furthermore, the lens component LPR of a positive refractive power includes the fifth lens unit L5 of a positive refractive power.

It is to be noted that the lens component LPF further includes two lens sub-components LPF1 and LPF2. The lens component LPR further includes two lens sub-components LPR1 and LPR2. Each of the lens sub-components LPF1, LPF2, LPR1, LPR2 can have a positive refractive power.

In exemplary embodiment 3, the lens component LPF of a positive refractive power is disposed on the object side of the fifth lens unit L5 which is the lens component LN, and the lens component LPR of a positive refractive power is disposed on the image side. In exemplary embodiment 3, the lens component LPF includes the third lens unit L3 of a positive refractive power which is the lens sub-component LPF1, and the fourth lens unit L4 of a positive refractive power which is the lens sub-component LPF2. The lens component LPR includes a sixth lens unit L6 having a positive refractive power. The lens component LPR further includes two lens sub-components LPR1 and LPR2. Either of the lens sub-components LPR1, LPR2 has a positive refractive power.

In exemplary embodiment 4, the lens component LPF of a positive refractive power is disposed on the object side of the fifth lens unit L5 and the sixth lens unit L6 which are lens components LN, and the lens component LPR of a positive refractive power is disposed on the image side. In exemplary embodiment 4, the lens component LPF includes the third lens unit L3 of a positive refractive power which is the lens sub-component LPF1, and the fourth lens unit L4 of a positive refractive power which is the lens sub-component LPF2. The lens component LPR includes a seventh lens unit L7 of a positive refractive power which is the lens sub-component LPR1, and an eighth lens unit L8 of a positive refractive power which is the lens sub-component LPR2.

A lens diameter of the lens component LN is reduced by a converging function of the lens component LPF of a positive refractive power.

It is to be noted that during the zooming from the wide angle end to the telephoto end, the air gap between the lens component LN and the lens component LPF is large and that between the lens component LN and the lens component LPR is small. When the interval between the lens components is changed in this manner, a high magnification varying effect is obtained.

In at least one exemplary embodiment, a moving state of each lens unit during the zooming can be as follows.

Exemplary embodiments 1, 2 of FIGS. 1, 5 relate to a five-unit zoom lens including the first lens unit L1, the second lens unit L2, the third lens unit L3, the fourth lens unit L4, and the fifth lens unit L5 which can move independently of one another during the zooming.

Exemplary embodiment 3 of FIG. 9 relates to a six-unit zoom lens including the first lens unit L1, the second lens unit L2, the third lens unit L3, the fourth lens unit L4, the fifth lens unit L5, and the sixth lens unit L6 which can move independently of one another during the zooming.

Figure 13:
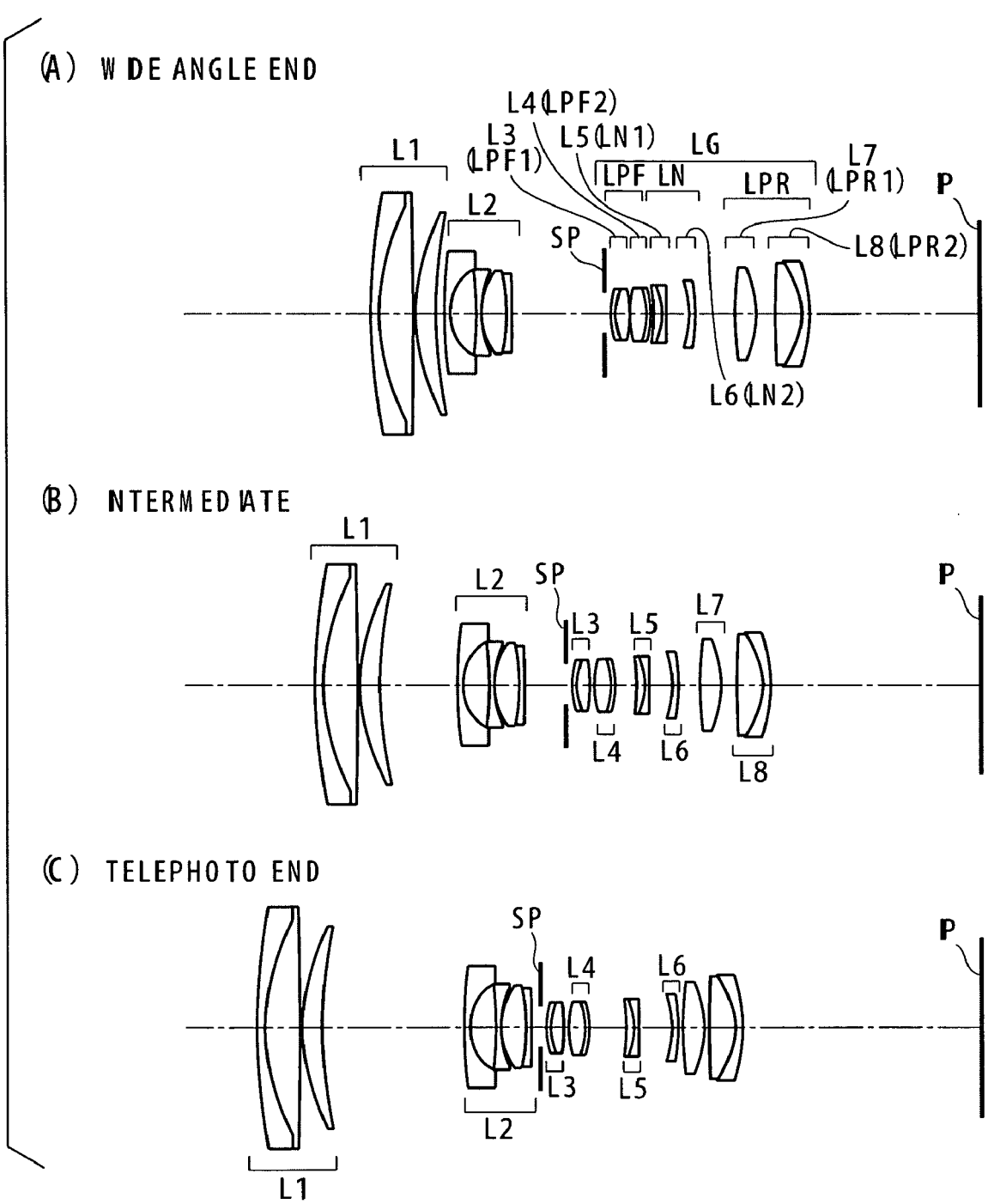
FIG. 13 illustrates lens sectional views of the zoom lens according to exemplary embodiment 4.

Exemplary embodiment 4 of FIG. 13 relates to an eight-unit zoom lens including the first lens unit L1, the second lens unit L2, the third lens unit L3, the fourth lens unit L4, the fifth lens unit L5, the sixth lens unit L6, the seventh lens unit L7, and the eighth lens unit L8 which can move independently of one another during the zooming.

It is to be noted that the aperture stop SP may be disposed between the second lens unit L2 and the lens component LN. In this arrangement of the aperture stop SP, the front lens sub-component LN1 on the object side in more vicinity of a pupil position can be used as the image stabilizing lens unit among two lens sub-components constituting the lens component LN. This is because a lens outer diameter of the image stabilizing lens unit can be reduced as compared with a case where the rear lens sub-component LN2 is selected as the image stabilizing lens unit, and the arrangement can facilitate the reduction of a driving torque. In in at least one exemplary embodiment, the rear lens sub-component LN2 is employed as the image stabilizing lens unit.

When the front lens sub-component LN1 is selected as the image stabilizing lens unit, the rear lens sub-component LN2 can include a single lens having a negative refractive power for the miniaturization of an optical system and the reduction of a lens cost.

In at least one exemplary embodiment, one or more of the following condition formulas can be satisfied:

$$1.2 < F1/Fm < 2.5 \quad (1)$$

$$0.2 < |F2/Fm| < 0.4 \quad (2)$$

$$0.4 < |FN/Fm| < 1.2 \quad (3)$$

$$0.6 < F3m/Fm < 1.2 \quad (4)$$

$$0.6 < \beta R < 1.6 \quad (5)$$

$$0.2 < FN/FBs < 0.8 \quad (6)$$

$$-1 < \frac{Ra + Rb}{Ra - Rb} < -0.15 \quad (7)$$

Here, it is assumed that focal lengths in the wide angle end and the telephoto end of the whole system are Fw, Ft, respectively. A focal length Fm in an intermediate zooming position can be defined as follows.

$$Fm = \sqrt{(Fw \cdot Ft)}.$$

Moreover, F1 denotes a focal length of the first lens unit L1, F2 denotes a focal length of the second lens unit L2, FN denotes a focal length in the wide angle end of the lens component LN of the rear lens group LG, and F3m denotes a composite focal length in the focal length Fm of the rear lens group LG.

Furthermore, βR denotes a product of lateral magnifications in the telephoto end (infinite distance object focusing time) of each lens unit (each lens sub-component) from the image stabilizing lens unit to the lens unit closest to the image side.

Additionally, FBs denotes a focal length of the front lens sub-component LN1, and Ra, Rb denote curvature radii of the surface closest to the object side and the surface closest to the image side of the image stabilizing lens unit.

Next, technical meanings of the respective condition formulas will be described.

The condition formulas (1) to (4) can be used to obtain mainly a compact zoom lens having a high image quality.

When exceeding an upper limit value of the condition formula (1), the refractive power of the first lens unit L1 becomes excessively weak, and increases of the lens outer diameter and the total lens length are incurred.

On the other hand, when exceeding a lower limit value, the refractive power of the first lens unit L1 becomes excessively strong, and it is difficult to reduce a higher-order aberration (e.g., spherical).

When exceeding an upper limit value of the condition formula (2), the refractive power of the second lens unit L2 weakens. The movement of each lens unit can be increased in order to obtain a certain zoom ratio, making it difficult to miniaturize the lens system.

On the other hand, when exceeding the lower limit value, the negative refractive power increases. Therefore, the Petzval sum increases in a negative direction, and an image plane curvature increases.

The condition formula (3) relates to the refractive power of the lens component LN having the image stabilizing lens unit. While a high zoom ratio can be achieved, the optical performance is maintained.

When an upper limit of the condition formula (3) is exceeded, and the negative refractive power of the lens component LN weakens, the movement of the lens component LN increases in order to perform a certain magnification varying function. As a result, the total lens length increases.

On the other hand, when the lower limit value is exceeded, and the negative refractive power of the lens component LN increases, a high-order spherical aberration or comatic aberration can be generated, and it is difficult to reduce the aberration.

The condition formula (4) represents a ratio of a composite refractive power (1/F3m) in the intermediate zoom region of the rear lens group LG to the focal distance Fm in the intermediate zoom position of the whole lens system, and indicates a condition for maintaining the high image quality while miniaturizing the lens system.

When exceeding the upper limit value of the condition formula (4), the positive refractive power of the rear lens group LG becomes excessively small, and the total lens length (length from the lens surface closest to the object side to the image plane) unfavorably increases.

Moreover, when the lower limit value of the condition formula (4) is exceeded, the value facilitates shortening the total lens length, but the refractive power of the second lens unit having a negative refractive power can be increased in order to obtain a certain focal length. As a result, a large high-order aberration can be generated, and it is difficult to reduce the aberration. The condition formula (5) indicates a condition for setting displacement of the image stabilizing lens unit to be as small as possible in a range in which the electrical-mechanical control is facilitated. Additionally, the formula appropriately sets a product βR of the lateral magnifications of the image stabilizing lens unit to the lens unit closest to the image side in the telephoto end which is most easily influenced by the image vibration.

When exceeding the upper limit value of the condition formula (5), it is possible to reduce the image vibration with less displacement, but the electrical/mechanical control for finely reducing the image vibration can become difficult.

When exceeding the lower limit value of the condition formula (5), the displacement of the image stabilizing lens unit, which can be used for reducing the image vibration, can be increased. As a result, the lens diameter of the image stabilizing lens unit can be increased in order to reduce shading of a ray at an image stabilizing time. Therefore, a lens weight of the image stabilizing lens unit can increase.

Consequently, in addition to the enlargement of the lens system, enlargement of an actuator can be incurred if there is a large driving torque (e.g., used to drive the image stabilizing lens unit).

The condition formula (6) relates to the refractive power of the front lens sub-component LN1 which is the image stabilizing lens unit. When this condition formula is satisfied, the displacement of the front lens sub-component LN1 at the image stabilizing time is suppressed, and further the high image quality can be maintained.

When the upper limit of the condition formula (6) is exceeded, and the negative refractive power of the front lens sub-component LN1 weakens, the displacement of the front lens sub-component LN1 for performing the image stabilizing function increases. In order to secure a certain peripheral quantity of light at an image stabilizing operation time, the lens diameter of the front lens sub-component LN1 increases.

When the lower limit value is exceeded, the negative refractive power of the front lens sub-component LN1 increases. Therefore, the large high-order spherical or comatic aberration can be generated, and it is difficult to reduce the aberration at the image stabilizing time.

It is to be noted that the image stabilizing lens unit may comprise a positive lens having a meniscus shape and a negative lens having a double concave shape in order to reduce the chromatic aberration and the spherical aberration generated during the image vibration reduction. Furthermore, when these two lenses are bonded, the chromatic and spherical aberrations are more effectively reduced.

The condition formula (7) indicates a condition for appropriately setting a lens surface shape of the image stabilizing lens unit in order to obtain a higher image quality.

When a range set by the condition formula (7) is exceeded, a cancellation relation unfavorably collapses between the spherical and comatic aberrations in two lens surfaces in a state in which the image stabilizing lens unit is displaced in order to reduce the image vibration, and is not displaced.

The numerical value ranges, in accordance with at least one exemplary embodiment, may satisfy formulas (1) to (7), which can have values as follows.

$$1.4 < F1/Fm < 2.2 \tag{1a}$$

$$0.25 < |F2/Fm| < 0.38 \tag{2a}$$

$$0.5 < |FN/Fm| < 1.0 \tag{3a}$$

-continued $$0.7 < F3m/Fm < 1.0 \quad (4a)$$

$$0.7 < \beta R < 1.4 \quad (5a)$$

$$0.25 < FN/FBs < 0.65 \quad (6a)$$

$$-0.9 < \frac{Ra+Rb}{Ra-Rb} < -0.2 \quad (7a)$$

In at least one exemplary embodiment, focusing of an infinitely distant object to a short distance object is performed, when the first lens unit L1 or the second lens unit L2 is moved toward the object side. For example, when the second lens unit L2 is moved to perform the focusing, the lens outer diameter of the first lens unit L1 has a reduced tendency to being increased.

It is to be noted that both of the first and second lens units L1, L2 may be moved to perform the focusing.

Next, a lens constitution of each lens unit will be described. In the first lens unit L1, there are arranged a negative lens whose lens surface on the image side has a concave shape, a positive lens, and a positive lens whose lens surface on the object side has a convex shape in order from the object side to the image side. This constitution of the first lens unit L1 is in accordnace with at least one exemplary embodiment and can facilitate reduction of the aberration. In the second lens unit L2, there are arranged a negative lens whose lens surface on the image side has a concave shape, a negative lens having a double concave (biconcave) shape, a positive lens whose lens surface on the object side has a convex shape, and a negative lens whose lens surface on the object side has a concave shape in order from the object side to the image side. This constitution of the second lens unit L2 is in accordnace with at least one exemplary embodiment and can facilitate reduction of the aberration.

In the rear lens group LG, there are arranged a lens component LPF of a positive refractive power as a whole, a lens component LN of a negative refractive power as a whole, and a lens component LPR of a positive refractive power as a whole in order from the object side to the image side. Furthermore, in the lens component LPF, there are arranged a lens sub-component LPF1 of a positive refractive power and a lens sub-component LPF2 of a positive refractive power in order from the object side to the image side. In the lens component LN, a lens sub-component LN1 of a negative refractive power, and a lens sub-component LN2 of a negative refractive power are arranged in order from the object side to the image side. The lens component LR includes a lens sub-component LPR1 of a positive refractive power and a lens sub-component LPR2 of a positive refractive power which are arranged in order from the object side to the image side.

The lens sub-component LPF1 includes a combination lens having a positive refractive power as a whole, in which a positive lens is combined (e.g., operatively connected, cemented together, bonded, pinned together, any other optical combining techniques and arangements as known by one of ordinary skill in the relevant art, and equivalents) to a negative lens (e.g., one having a meniscus shape) and having a concave surface on the image side. The lens component LPF2 includes a single lens having a positive refractive power, or a combination lens obtained by combining a positive lens to a negative lens and having a positive refractive power as a whole. This constitution of the lens component LPF is in accordnace with at least one exemplary embodiment and can facilitate reduction of the aberration.

The lens component LN1 includes a combination lens obtained by combining a positive lens whose surface on the image side has a convex shape to a negative lens whose lens surface on the object side has a concave shape, and having a negative refractive power as a whole. The lens component LN2 includes a negative lens whose surface on the object side has a concave shape.

The lens component LPR1 includes a positive lens whose surface on the image side has a convex shape. The lens component LPR2 includes a positive lens whose surface on the image side has a convex shape and a negative lens whose surface on the object side has a concave shape which are arranged in order from the object side to the image side.

A diffractive optical element, or a gradient index lens may be introduced for further enhancement of the optical performances.

Numerical Value Examples 1 to 4 corresponding to Exemplary embodiments 1 to 4 will be described hereinafter. In each numerical value examples, i denotes an order of the surface from the object side, Ri denotes a radius of curvature of each surface, Di denotes an interval between an i-th surface and an (i+1) surface, and Ni, vi denote a refractive index, and Abbe number based on a d line, respectively.

Moreover, assuming that the displacement in an optical axis direction in a position having a height h from the optical axis is X on the basis of a surface vertex, an aspherical shape is represented by the following:

$$x = \frac{(1/R)h^2}{1+\sqrt{\{1-(1+k)(h/R)^2\}}} + Ah^2 + Bh^4 + Ch^6 + Dh^8 + Eh^{10}$$

where R denotes a paraxial curvature radius, k denotes a conic constant, and A, B, C, D, E denote aspherical coefficients. In the numerical value examples, a constant or a coefficient is 0 unless described otherwise.

Moreover, "e-X" means "$\times 10^{-X}$". Furthermore, f denotes a focal length, Fno denotes F number, and Ω denotes a half angle of view. Additionally, Table-1 shows correspondences between the above-described condition formulas (1) to (7) and the numerical values in the numerical value examples.

Numerical Value Example 1

| f = 17.55~82.51 Fno = 4.10~4.97 2ω = 75.7~18.8 | | | |
|---|---|---|---|
| R1 = 110.199 | D1 = 1.50 | N1 = 1.846660 | v1 = 23.9 |
| R2 = 45.988 | D2 = 7.95 | N2 = 1.712995 | v2 = 53.9 |
| R3 = 579.052 | D3 = 0.12 | | |
| R4 = 44.008 | D4 = 5.30 | N3 = 1.772499 | v3 = 49.6 |
| R5 = 122.296 | D5 = variable | | |

-continued

| | | | |
|---|---|---|---|
| R6 = 115.056 | D6 = 1.20 | N4 = 1.772499 | v4 = 49.6 |
| R7 = 10.499 | D7 = 5.07 | | |
| R8 = −126.527 | D8 = 1.00 | N5 = 1.882997 | v5 = 40.8 |
| R9 = 24.408 | D9 = 0.15 | | |
| R10 = 16.369 | D10 = 6.50 | N6 = 1.761821 | v6 = 26.5 |
| R11 = −25.012 | D11 = 0.11 | | |
| R12 = −23.378 | D12 = 1.00 | N7 = 1.804000 | v7 = 46.6 |
| R13 = 53.261 | D13 = variable | | |
| R14 = diaphragm | D14 = variable | | |
| R15 = 49.724 | D15 = 0.80 | N8 = 1.804000 | v8 = 46.6 |
| R16 = 14.060 | D16 = 3.50 | N9 = 1.487490 | v9 = 70.2 |
| R17 = −43.100 | D17 = 0.15 | | |
| R18 = 21.634 | D18 = 4.20 | N10 = 1.487490 | v10 = 70.2 |
| R19 = −16.072 | D19 = 0.90 | N11 = 1.846660 | v11 = 23.9 |
| R20 = −19.909 | D20 = variable | | |
| R21 = −44.276 | D21 = 2.00 | N12 = 1.846660 | v12 = 23.9 |
| R22 = −16.791 | D22 = 0.80 | N13 = 1.723420 | v13 = 38.0 |
| R23 = 108.148 | D23 = 7.59 | | |
| R24 = −17.279 | D24 = 1.20 | N14 = 1.487490 | v14 = 70.2 |
| R25 = −32.589 | D25 = variable | | |
| R26 = 52.525 | D26 = 7.50 | N15 = 1.583126 | v15 = 59.4 |
| *R27 = −21.652 | D27 = 0.15 | | |
| R28 = −73.657 | D28 = 4.20 | N16 = 1.487490 | v16 = 70.2 |
| R29 = −24.960 | D29 = 0.91 | | |
| R30 = −19.074 | D30 = 1.30 | N17 = 1.846660 | v17 = 23.9 |
| R31 = −40.536 | | | |

| \focal distance variable interval\ | 17.55 | 36.63 | 82.51 |
|---|---|---|---|
| D5 | 2.15 | 15.83 | 30.27 |
| D13 | 12.92 | 5.91 | 1.83 |
| D14 | 4.71 | 3.64 | 2.35 |
| D20 | 1.00 | 5.37 | 8.77 |
| D25 | 9.25 | 4.89 | 1.48 | aspherical coefficient

| 27 surface: | k = −1.25893e−01 D = −2.81600e−12 | A = 0 E = −3.43647e−13 | B = 9.25532e−06 | C = −3.95378e−10 |
|---|---|---|---|---|

Numerical Value Example 2

| f = 17.50~82.48 Fno = 3.61~4.48 2ω = 75.9~18.8 | | | |
|---|---|---|---|
| R1 = 138.366 | D1 = 1.80 | N1 = 1.846660 | v1 = 23.9 |
| R2 = 51.329 | D2 = 7.90 | N2 = 1.772499 | v2 = 49.6 |
| R3 = 1842.315 | D3 = 0.12 | | |
| R4 = 43.285 | D4 = 4.30 | N3 = 1.733997 | v3 = 51.5 |
| R5 = 94.213 | D5 = variable | | |
| *R6 = 96.073 | D6 = 0.05 | N4 = 1.524210 | v4 = 51.4 |
| R7 = 79.853 | D7 = 1.20 | N5 = 1.772499 | v5 = 49.6 |
| R8 = 12.044 | D8 = 6.04 | | |
| R9 = −45.600 | D9 = 1.00 | N6 = 1.772499 | v6 = 49.6 |
| R10 = 24.054 | D10 = 0.15 | | |
| R11 = 19.529 | D11 = 4.90 | N7 = 1.740769 | v7 = 27.8 |
| R12 = −29.817 | D12 = 0.40 | | |
| R13 = −22.975 | D13 = 1.00 | N8 = 1.696797 | v8 = 55.5 |
| R14 = −489.926 | D14 = variable | | |
| R15 = diaphragm | D15 = 1.50 | | |
| R16 = 32.590 | D16 = 0.90 | N9 = 1.834807 | v9 = 42.7 |
| R17 = 16.456 | D17 = 2.90 | N10 = 1.487490 | v10 = 70.2 |
| R18 = −67.158 | D18 = 0.15 | | |
| R19 = 26.607 | D19 = 3.10 | N11 = 1.487490 | v11 = 70.2 |
| R20 = −18.935 | D20 = 1.00 | N12 = 1.846660 | v12 = 23.9 |
| R21 = −26.830 | D21 = variable | | |
| R22 = −49.626 | D22 = 2.00 | N13 = 1.846660 | v13 = 23.9 |
| R23 = −17.431 | D23 = 0.80 | N14 = 1.723420 | v14 = 38.0 |
| R24 = 93.982 | D24 = 4.50 | | |
| R25 = −18.206 | D25 = 1.20 | N15 = 1.516330 | v15 = 64.1 |
| R26 = −29.578 | D26 = variable | | |
| R27 = −5922.176 | D27 = 4.30 | N16 = 1.583126 | v16 = 59.4 |
| *R28 = −27.532 | D28 = 0.15 | | |

-continued

| | | | |
|---|---|---|---|
| R29 = 101.045 | D29 = 5.30 | N17 = 1.496999 | v17 = 81.5 |
| R30 = −23.723 | D30 = 1.72 | | |
| R31 = −19.779 | D31 = 1.50 | N18 = 1.846660 | v18 = 23.9 |
| R32 = −35.860 | | | |

| \focal distance variable interval\ | 17.50 | 37.99 | 82.48 |
|---|---|---|---|
| D5 | 2.30 | 17.58 | 32.49 |
| D14 | 18.47 | 8.11 | 1.56 |
| D21 | 1.08 | 5.97 | 9.29 |
| D26 | 9.41 | 4.52 | 1.20 | aspherical coefficient

| 6 surface: | k = −1.85891e+01 D = 9.68962e−11 | A = 0 E = −8.34696e−14 | B = 1.33203e−05 | C = −4.15302e−08 |
|---|---|---|---|---|
| 28 surface: | k = 1.04449e−01 D = −7.21339e−12 | A = 0 E = −2.07062e−13 | B = 3.09979e−06 | C = −2.93942e−09 |

Numerical Value Example 3

| f = 17.50~82.42 Fno = 3.60~5.33 2ω = 75.8~18.8 | | | |
|---|---|---|---|
| R1 = 104.472 | D1 = 1.80 | N1 = 1.846660 | v1 = 23.9 |
| R2 = 44.660 | D2 = 6.90 | N2 = 1.772499 | v2 = 49.6 |
| R3 = 326.415 | D3 = 0.12 | | |
| R4 = 47.860 | D4 = 4.60 | N3 = 1.733997 | v3 = 51.5 |
| R5 = 142.923 | D5 = variable | | |
| *R6 = 70.210 | D6 = 0.05 | N4 = 1.524210 | v4 = 51.4 |
| R7 = 75.152 | D7 = 1.20 | N5 = 1.772499 | v5 = 49.6 |
| R8 = 10.804 | D8 = 5.83 | | |
| R9 = −55.330 | D9 = 1.00 | N6 = 1.834807 | v6 = 42.7 |
| R10 = 34.736 | D10 = 0.13 | | |
| R11 = 17.972 | D11 = 5.00 | N7 = 1.740769 | v7 = 27.8 |
| R12 = −29.277 | D12 = 0.25 | | |
| R13 = −25.299 | D13 = 1.00 | N8 = 1.696797 | v8 = 55.5 |
| R14 = 54.622 | D14 = variable | | |
| R15 = diaphragm | D15 = 1.50 | | |
| R16 = 34.064 | D16 = 0.90 | N9 = 1.834807 | v9 = 42.7 |
| R17 = 13.350 | D17 = 3.40 | N10 = 1.487490 | v10 = 70.2 |
| R18 = −40.663 | D18 = variable | | |
| R19 = 23.587 | D19 = 3.80 | N11 = 1.487490 | v11 = 70.2 |
| R20 = −16.337 | D20 = 1.00 | N12 = 1.846660 | v12 = 23.9 |
| R21 = −20.944 | D21 = variable | | |
| R22 = −47.291 | D22 = 2.00 | N13 = 1.846660 | v13 = 23.9 |
| R23 = −17.174 | D23 = 0.80 | N14 = 1.723420 | v14 = 38.0 |
| R24 = 442.332 | D24 = 3.62 | | |
| R25 = −28.511 | D25 = 1.00 | N15 = 1.589130 | v15 = 61.1 |
| R26 = 56.357 | D26 = variable | | |
| R27 = 126.327 | D27 = 6.00 | N16 = 1.583126 | v16 = 59.4 |
| *R28 = −25.957 | D28 = 0.15 | | |
| R29 = 76.900 | D29 = 7.50 | N17 = 1.496999 | v17 = 81.5 |
| R30 = −23.481 | D30 = 1.67 | | |
| R31 = −21.730 | D31 = 1.50 | N18 = 1.846660 | v18 = 23.9 |
| R32 = −46.529 | | | |

| \focal distance variable interval\ | 17.50 | 37.98 | 82.42 |
|---|---|---|---|
| D5 | 2.30 | 17.08 | 30.08 |
| D14 | 16.63 | 7.65 | 1.02 |
| D18 | 1.26 | 1.78 | 1.91 |
| D21 | 0.95 | 4.86 | 7.24 |
| D26 | 9.74 | 5.30 | 2.79 | aspherical coefficient

| 6 surface: | k = −1.96050e+00 D = 3.35453e−10 | A = 0 E = −6.60788e−13 | B = 1.62390e−06 | C = −5.85504e−08 |
|---|---|---|---|---|
| 28 surface: | k = −1.14685e−03 D = 2.06119e−12 | A = 0 E = 2.40854e−13 | B = 4.41597e−06 | C = 7.68703e−09 |

Numerical Value Example 4

| f = 17.50~82.53 Fno = 4.23~4.97 2ω = 75.8~18.8 | | | |
|---|---|---|---|
| R1 = 148.518 | D1 = 1.80 | N1 = 1.846660 | v1 = 23.9 |
| R2 = 51.813 | D2 = 8.00 | N2 = 1.772499 | v2 = 49.6 |
| R3 = 9506.708 | D3 = 0.12 | | |
| R4 = 44.487 | D4 = 4.90 | N3 = 1.733997 | v3 = 51.5 |
| R5 = 102.758 | D5 = variable | | |
| *R6 = 184.157 | D6 = 0.05 | N4 = 1.524210 | v4 = 51.4 |
| R7 = 146.756 | D7 = 1.20 | N5 = 1.772499 | v5 = 49.6 |
| R8 = 11.800 | D8 = 6.15 | | |
| R9 = −45.108 | D9 = 1.00 | N6 = 1.772499 | v6 = 49.6 |
| R10 = 25.122 | D10 = 0.15 | | |
| R11 = 19.729 | D11 = 5.50 | N7 = 1.740769 | v7 = 27.8 |
| R12 = −34.418 | D12 = 0.45 | | |
| R13 = −26.585 | D13 = 1.00 | N8 = 1.696797 | v8 = 55.5 |
| R14 = −143.314 | D14 = variable | | |
| R15 = diaphragm | D15 = 1.50 | | |
| R16 = 33.319 | D16 = 0.80 | N9 = 1.834807 | v9 = 42.7 |
| R17 = 15.866 | D17 = 3.00 | N10 = 1.487490 | v10 = 70.2 |
| R18 = −65.808 | D18 = variable | | |
| R19 = 27.123 | D19 = 3.50 | N11 = 1.487490 | v11 = 70.2 |
| R20 = −20.578 | D20 = 1.00 | N12 = 1.846660 | v12 = 23.9 |
| R21 = −27.671 | D21 = variable | | |
| R22 = −52.058 | D22 = 2.00 | N13 = 1.846660 | v13 = 23.9 |
| R23 = −17.339 | D23 = 0.80 | N14 = 1.723420 | v14 = 38.0 |
| R24 = 85.236 | D24 = variable | | |
| R25 = −19.866 | D25 = 1.20 | N15 = 1.516330 | v15 = 64.1 |
| R26 = −42.697 | D26 = variable | | |
| R27 = 448.765 | D27 = 4.30 | N16 = 1.583126 | v16 = 59.4 |
| *R28 = −26.937 | D28 = variable | | |
| R29 = 148.541 | D29 = 5.60 | N17 = 1.496999 | v17 = 81.5 |
| R30 = −23.052 | D30 = 0.50 | | |
| R31 = −20.241 | D31 = 1.50 | N18 = 1.846660 | v18 = 23.9 |
| R32 = −36.595 | | | |

| \focal distance variable interval\ | 17.50 | 38.00 | 82.53 |
|---|---|---|---|
| D5 | 1.77 | 17.41 | 31.85 |
| D14 | 20.95 | 9.00 | 1.75 |
| D18 | 0.35 | 1.17 | 1.09 |
| D21 | 1.04 | 4.91 | 8.50 |
| D24 | 5.22 | 5.66 | 7.80 |
| D26 | 9.37 | 4.96 | 1.49 |
| D28 | 4.50 | 3.62 | 1.06 | aspherical coefficient

| 6 surface: | k = 5.52104e+00<br>D = 5.04968e−11 | A = 0<br>E = 1.66734e−14 | B = 1.46962e−05 | C = −4.66433e−08 |
|---|---|---|---|---|
| 28 surface: | k = 1.21651e−01<br>D = −2.40736e−10 | A = 0<br>E = 2.72993e−13 | B = 1.08173e−06 | C = 2.59213e−08 |

[Table 1]

TABLE 1

| Condition formula | Exemplary Embodiment 1 | Exemplary Embodiment 2 | Exemplary Embodiment 3 | Exemplary Embodiment 4 |
|---|---|---|---|---|
| (1) F1/Fm | 1.76 | 1.94 | 1.84 | 1.92 |
| (2) |F2/Fm| | 0.29 | 0.35 | 0.33 | 0.36 |
| (3) |FN/Fm| | 0.79 | 0.91 | 0.58 | 0.80 |
| (4) F3m/Fm | 0.80 | 0.81 | 0.80 | 0.91 |
| (5) βR | 1.12 | 0.86 | 1.28 | 1.00 |
| (6) FN/FBs | 0.55 | 0.61 | 0.27 | 0.54 |
| (7) (Ra + Rb)/(Ra − Rb) | −0.42 | −0.31 | −0.81 | −0.24 |

Next, an example will be described with reference to FIG. 17. In the example, a zoom lens system of at least one exemplary embodiment is applied to an image pickup apparatus.

FIG. 17 is a major part schematic diagram of a single-lens reflex camera. In FIG. 17, reference numeral 10 denotes a photographic lens having a zoom lens 1 according to exemplary embodiments 1 to 4. The zoom lens 1 is held in a lens barrel 2 which is a holding member. Reference numeral 20 denotes a camera main body. The camera main body comprises: a quick return mirror 3 which reflects a light beam upwards from the photographic lens 10; a focus plate 4 disposed in an image forming position of the photographic lens 10; a penta prism 5 for converting an inverse image formed on the focus plate 4 into an erected image; an eyepiece lens 6 for observing the erected image. Reference numeral 7 denotes a photosensitive surface, and a solid image pickup device (e.g., photoelectric conversion device, a CCD sensor, a CMOS sensor, a silver salt film, or other image pickup devices as known by one of ordinary skill in the relevant arts and equivalents). At a photographic time, the quick return mirror 3 retreats from an optical path, and an image is formed on the photosensitive surface 7 by the photographic lens 10.

When the zoom lens system of at least one exemplary embodiment is applied to a change lens for the single-lens reflex camera, it is possible to realize an image pickup apparatus having high optical performances.

It is to be noted that the zoom lens system of at least one exemplary embodiment is similarly applicable to a single-lens reflex camera which does not have any quick return mirror.

A zoom lens in accordance with at least one exemplary embodiment can be used with a photographic image pickup system (e.g., a camera, a video camera, a digital still camera, other image pickup systems as known by one of ordinary skill in the relevant arts, and equivalents). While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese patent Laid-Open No. 2004-240085 filed Aug. 19, 2004, which is hereby incorporated by reference herein in its entirety.

What is claimed is:

1. A zoom lens system comprising, in order from an object side to an image side:
    a first lens unit having a positive optical power;
    a second lens unit having a negative optical power; and
    a rear lens group having a positive optical power as a whole in an entire zoom range, the rear lens group having a plurality of lens units which move during zooming,
    wherein the plurality of lens units contains a lens component having a negative optical power, whose interval from the lens unit disposed adjacent to the component changes during the zooming,
    the lens component of the negative optical power consists of:
    a front lens sub-component of a negative optical power; and a rear lens sub-component of a negative optical power,
        wherein at least one of a part of the front lens sub-component and the rear lens sub-component is moved in such a manner as to have a component in a vertical direction with respect to an optical axis, thereby displacing an image formed by the zoom lens system, wherein assuming that a focal length in a wide angle end of the whole zoom lens system is Fw, and a focal length in a telephoto end of the whole zoom lens system is Ft, a focal length Fm can be defined as:

$Fm=\sqrt{(Fw \cdot Ft)}$, and where a focal length of the first lens unit is F1, a focal length of the second lens unit is F2, a focal length of the lens component having the negative optical power is FN, and the focal length of the rear lens group in a zoom position of the focal length Fm is F3m, wherein the following conditions are satisfied:

$1.2<F1/Fm<2.5$;

$0.2<|F2/Fm|<0.4$;

$0.4<|FN/Fm|<1.2$; and $0.6<F3m/Fm<1.2$.

2. The zoom lens system according to claim 1, wherein the plurality of lens units have a lens component having a positive optical power disposed on the object side of the lens component having the negative optical power, and a lens component having a positive optical power disposed on the image side of the lens component of the negative optical power.

3. The zoom lens system according to claim 1, further comprising:
    an aperture stop disposed between the second lens unit and the lens component having the negative optical power,
    wherein the front lens sub-component is moved in such a manner as to have the component in the vertical direction with respect to the optical axis, thereby displacing the image formed by the zoom lens system.

4. The zoom lens system according to claim 3, wherein the rear lens sub-component includes a negative lens element.

5. The zoom lens system according to claim 1, further configured to form an image on a photoelectric conversion device.

6. An image pickup apparatus comprising:
    the zoom lens system according to claim 1; and
    a photoelectric conversion device which is configured to receive an image from the zoom lens system.

7. A zoom lens system comprising, in order from an object side to an image side:
    a first lens unit having a positive optical power;
    a second lens unit having a negative optical power; and
    a rear lens group having a positive optical power as a whole in an entire zoom range, the rear lens group having a plurality of lens units which move during zooming,
    wherein the plurality of lens units contains a lens component having a negative optical power, whose interval from the lens unit disposed adjacent to the component changes during the zooming,
    the lens component of the negative optical power consists of:
    a front lens sub-component of a negative optical power; and a rear lens sub-component of a negative optical power,
    wherein at least one of a part of the front lens sub-component and the rear lens sub-component is moved in such a manner as to have a component in a vertical direction with respect to an optical axis, thereby displacing an image formed by the zoom lens system, wherein assuming that βR denotes a product of lateral magnifications in a telephoto end of each lens sub-component and each lens unit from the lens sub-component moving in such a manner as to have the component in the vertical direction to the optical axis to the lens unit closest to the image side, the following condition is satisfied:

$0.6<\beta R<1.6$

8. The zoom lens system according to claim 7, wherein the plurality of lens units have a lens component having a positive optical power disposed on the object side of the lens component having the negative optical power, and a lens-component having a positive optical power disposed on the image side of the lens component of the negative optical power.

9. The zoom lens system according to claim 7, further comprising:
an aperture stop disposed between the second lens unit and the lens component having the negative optical power,
wherein the front lens sub-component is moved in such a manner as to have the component in the vertical direction with respect to the optical axis, thereby displacing the image formed by the zoom lens system.

10. The zoom lens system according to claim 9, wherein the rear lens sub-component includes a negative lens element.

11. The zoom lens system according to claim 7, further configured to form an image on a photoelectric conversion device.

12. An image pickup apparatus comprising:
the zoom lens system according to claim 7; and
a photoelectric conversion device which is configured to receive an image from the zoom lens system.

13. A zoom lens system comprising, in order from an object side to an image side:
a first lens unit having a positive optical power;
a second lens unit having a negative optical power; and
a rear lens group having a positive optical power as a whole in an entire zoom range, the rear lens group having a plurality of lens units which move during zooming,
wherein the plurality of lens units contains a lens component having a negative optical power, whose interval from the lens unit disposed adjacent to the component changes during the zooming,
the lens component of the negative optical power consists of:
a front lens sub-component of a negative optical power;
end a rear lens sub-component of a negative optical power,
wherein at least one of a part of the front lens sub-component and the rear lens sub-component is moved in such a manner as to have a component in a vertical direction with respect to an optical axis, thereby displacing an image formed by the zoom lens system, wherein the front lens sub-component is moved in such a manner as to have the component in the vertical direction with respect to the optical axis, thereby displacing the image formed by the zoom lens system, and
a focal length in a wide angle end of the lens component having the negative optical power is FN, and a focal length of the front lens sub-component is FBs, the following condition is satisfied:

$$0.2 < FN/FBs < 0.8.$$

14. The zoom lens system according to claim 13, wherein the plurality of lens units have a lens component having a positive optical power disposed on the object side of the lens component having the negative optical power, and a lens component having a positive optical power disposed on the image side of the lens component of the negative optical power.

15. The zoom lens system according to claim 13, further comprising:
an aperture stop disposed between the second lens unit and the lens component having the negative optical power,
wherein the front lens sub-component is moved in such a manner as to have the component in the vertical direction with respect to the optical axis, thereby displacing the image formed by the zoom lens system.

16. The zoom lens system according to claim 15, wherein the rear lens sub-component includes a negative lens element.

17. The zoom lens system according to claim 13, further configured to form an image on a photoelectric conversion device.

18. An image pickup apparatus comprising:
the zoom lens system according to claim 13; and
a photoelectric conversion device which is configured to receive an image from the zoom lens system.

* * * * *